US012323963B2

(12) United States Patent
Chandrasekhar et al.

(10) Patent No.: US 12,323,963 B2
(45) Date of Patent: Jun. 3, 2025

(54) CONFIGURATION OF BEAM INDICATION IN A NEXT GENERATION MMWAVE SYSTEM

(71) Applicant: Samsung Electronics Co., Ltd., Suwon-si (KR)

(72) Inventors: Vikram Chandrasekhar, Mountain View, CA (US); Boon Loong Ng, Plano, TX (US); Young-Han Nam, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 225 days.

(21) Appl. No.: 16/057,281

(22) Filed: Aug. 7, 2018

(65) Prior Publication Data
US 2019/0069285 A1 Feb. 28, 2019

Related U.S. Application Data

(60) Provisional application No. 62/576,299, filed on Oct. 24, 2017, provisional application No. 62/570,136, (Continued)

(51) Int. Cl.
*H04W 72/04* (2009.01)
*H04B 7/06* (2006.01)
(Continued)

(52) U.S. Cl.
CPC .......... *H04W 72/51* (2023.01); *H04B 7/0695* (2013.01); *H04B 7/088* (2013.01);
(Continued)

(58) Field of Classification Search
CPC combination set(s) only.
See application file for complete search history.

(56) References Cited

U.S. PATENT DOCUMENTS 9,591,634 B2 * 3/2017 Pan ................ H04L 5/0091
2010/0215011 A1 * 8/2010 Pan ................ H04L 5/14
370/329

(Continued)

FOREIGN PATENT DOCUMENTS

CN 104662984 A 5/2015
CN 104704786 A 6/2015
(Continued)

OTHER PUBLICATIONS

LTE; Evolved Universal Terrestrial Radio Access (E-UTRA); Physical Channels and Modulation (3GPP TS 36.211 Version 14.2.0 Release 14), ETSI TS 136.211, V14.2.0, Apr. 2017, 196 pages.

(Continued)

*Primary Examiner* — Derrick W Ferris
*Assistant Examiner* — Won Jun Choi

(57) ABSTRACT

A UE includes a transceiver configured to receive, from a base station, a higher layer parameter that is set as enabled or disabled. The higher layer parameter is explicitly or implicitly determined to be disabled by Boolean parameters or DL DCI format types. The UE also includes a controller configured to, based on identifying that the higher layer parameter is set as enabled either on per CORESET basis or on per DCI format basis, assume that, for receiving a PDSCH, an indication state is present in a DL DCI transmitted by a PDCCH on a CORESET, wherein the indication state indicates an associated PDSCH QCL parameter. A transceiver receives the associated PDSCH using the QCL parameter from the base station.

6 Claims, 13 Drawing Sheets

Related U.S. Application Data filed on Oct. 10, 2017, provisional application No. 62/563,419, filed on Sep. 26, 2017, provisional application No. 62/555,377, filed on Sep. 7, 2017, provisional application No. 62/549,476, filed on Aug. 24, 2017.

(51) Int. Cl.

| | | |
|---|---|---|
| *H04B 7/08* | (2006.01) | |
| *H04W 72/14* | (2009.01) | |
| *H04W 72/23* | (2023.01) | |
| *H04W 72/51* | (2023.01) | |
| *H04B 7/0404* | (2017.01) | |
| *H04W 72/0446* | (2023.01) | |

(52) U.S. Cl.
CPC ........... *H04W 72/23* (2023.01); *H04B 7/0404* (2013.01); *H04W 72/0446* (2013.01)

(56) References Cited

U.S. PATENT DOCUMENTS

| | | | |
|---|---|---|---|
| 2014/0010178 A1 | 1/2014 | Yu et al. | |
| 2014/0119266 A1 | 5/2014 | Ng et al. | |
| 2015/0180625 A1 | 6/2015 | Park et al. | |
| 2015/0282126 A1 | 10/2015 | Park et al. | |
| 2015/0289235 A1 | 10/2015 | Park et al. | |
| 2015/0349940 A1 | 12/2015 | Kim et al. | |
| 2016/0036571 A1* | 2/2016 | Park | H04L 5/0048 370/330 |
| 2016/0323022 A1 | 11/2016 | Rahman et al. | |
| 2017/0202025 A1* | 7/2017 | Ouchi | H04W 16/32 |
| 2018/0042000 A1 | 2/2018 | Zhang et al. | |
| 2018/0219605 A1* | 8/2018 | Davydov | H04B 7/0862 |
| 2018/0227886 A1* | 8/2018 | Chou | H04B 7/0695 |
| 2019/0053212 A1* | 2/2019 | Liu | H04L 5/0091 |
| 2019/0150187 A1* | 5/2019 | Park | H04L 5/0094 370/330 |
| 2019/0199406 A1* | 6/2019 | Wang | H04L 25/0224 |
| 2019/0349915 A1* | 11/2019 | Ahn | H04L 5/0048 |
| 2020/0163063 A1* | 5/2020 | Gao | H04W 72/23 |
| 2020/0221428 A1* | 7/2020 | Moon | H04B 7/024 |
| 2022/0201727 A1* | 6/2022 | Gong | H04L 5/0055 |

FOREIGN PATENT DOCUMENTS

| | | | | |
|---|---|---|---|---|
| IN | 104956611 A | | 9/2015 | |
| RU | 2014153522 A | | 7/2016 | |
| WO | 2016165128 A1 | | 10/2016 | |
| WO | PCT/CN2017/109384 | * | 11/2016 | ............. H04B 7/024 |
| WO | PCT/KR2017/004810 | * | 5/2017 | ............. H04W 72/14 |
| WO | 2017095470 A1 | | 6/2017 | |
| WO | PCT/CN2018/091693 | * | 8/2017 | ........ H04W 72/0406 |

OTHER PUBLICATIONS

LTE; Evolved Universal Terrestrial Radio Access (E-UTRA); Multiplexing and Channel Coding (3GPP TS 36.212 Version 14.2.0 Release 14), ETSI TS 136.212, V14.2.0, Apr. 2017, 206 pages.
LTE; Evolved Universal Terrestrial Radio Access (E-UTRA); Physical Layer Procedures (3GPP TS 36.213 Version 14.2.0 Release 14), ETSI TS 136.213, V12.3.0, Apr. 2017, 456 pages.
LTE; Evolved Universal Terrestrial Radio Access (E-UTRA); Medium Access Control (MAC) protocol specification (3GPP TS 36.321 Version 14.2.1 Release 14), ETSI TS 136.321, V14.2.1, May 2017, 108 pages.
LTE; Evolved Universal Terrestrial Radio Access (E-UTRA); Radio Resource Control (RRC) Protocol Specification (3GPP TS 36.331 Version 14.2.2 Release 14), ETSI TS 136.331, V14.2.2, May 2017, 727 pages.
Extended European Search Report regarding Application No. 18847864. 8, dated May 12, 2020, 17 pages.
Samsung, "DL beam management for NR", 3GPP TSG RAN WG1 NR Ad-Hoc#2, R1-1710654, Jun. 2017, 4 pages.
Qualcomm, "Potential agreements on beam management", 3GPP TSG RAN WG1 Meeting #89, R1-1709496, May 2017, 12 pages.
CATT, "Downlink beam indication", 3GPP TSG RAN WG1 Meeting #90, Aug. 21-25, 2017, 6 pages, R1-1712377.
Samsung, "On Beam Indication", 3GPP TSG RAN WG1 NR #90, Aug. 21-25, 2017, 9 pages, R1-1713595.
Samsung, "Discussion on beam indication for PDSCH", 3GPP TSG RAN WG1 Meeting #90, 4 pages, R1-1714513.
Huawei, HiSilicon, "Beam indication for control and data channels", 3GPP TSG RAN WG1 Meeting #90, Aug. 21-25, 2017, 7 pages, R1-1712222.
International Search Report dated Dec. 4, 2018 in connection with International Patent Application No. PCT/KR2018/009787, 3 pages.
Written Opinion of the International Searching Authority dated Dec. 4, 2018 in connection with International Patent Application No. PCT/KR2018/009787, 6 pages.
European Patent Office, Communication pursuant to Article 94(3) EPC issued Feb. 16, 2023 regarding Application No. 18847864.8, 13 pages.
Chinese National Intellectual Property Administration, First Office Action issued Feb. 28, 2023 regarding Application No. 201880054803. 1, 21 pages.
Huawei et al., "QCL indication of downlink control channel and beam management reference signals", 3GPP TSG RAN WG1 NR Ad Hoc Meeting, R1-1700405, Jan. 2017, 4 pages.
Intellectual Property India, Examination Report issued Apr. 7, 2022 regarding Application No. 202037012412, 7 pages.
Communication pursuant to Article 94(3) EPC dated Apr. 16, 2021 in connection with European Patent Application No. 18 847 864.8, 16 pages.
European Patent Office, Communication pursuant to Article 94(3) EPC issued Nov. 27, 2024 regarding Application No. 18847864.8, 10 pages.

* cited by examiner

CONFIGURATION OF BEAM INDICATION IN A NEXT GENERATION MMWAVE SYSTEM

CROSS-REFERENCE TO RELATED APPLICATIONS AND CLAIM OF PRIORITY

The present application claims priority to U.S. Provisional Patent Application Ser. No. 62/549,476, filed on Aug. 24, 2017; U.S. Provisional Patent Application Ser. No. 62/555,377, filed on Sep. 7, 2017; U.S. Provisional Patent Application Ser. No. 62/563,419, filed on Sep. 26, 2017; U.S. Provisional Patent Application Ser. No. 62/570,136, filed on Oct. 10, 2017; and U.S. Provisional Patent Application Ser. No. 62/576,299, filed on Oct. 24, 2017. The content of the above-identified patent document is incorporated herein by reference.

TECHNICAL FIELD

The present application relates generally to transmission schemes for a Physical Sidelink Shared Channel (PSSCH) and Physical Sidelink Control Channel (PSCCH) to support Vehicle-to-Vehicle (V2V) communication in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide transmission structures and format in advanced communication systems.

In one aspect, a user equipment (UE) includes a transceiver configured to receive, from a base station, a higher layer parameter that is set as enabled or disabled. The UE also includes a controller configured to based on identifying that the higher layer parameter is set as enabled, assume that, for receiving a physical downlink (DL) shared channel (PDSCH), an indication state is present in DL control information (DCI), conveying a downlink (DL) assignment, transmitted by a physical DL control channel (PDCCH) on a control resource set (CORESET), wherein the indication state indicates an associated PDSCH antenna port quasi co-location (QCL) parameter. The controller is further configured to cause the transceiver to receive the associated PDSCH using the QCL parameter from the base station.

In one embodiment, the controller is further configured to, based on identifying reception of a DL assignment either on a certain DCI format type, or on a CORESET whose higher layer parameter is set to disabled, assume that the indication state applied for receiving the scheduled PDSCH is the same as an indication state applied on that CORESET for receiving the scheduling PDCCH.

In one embodiment, based on identifying that the higher layer parameter is set as disabled for the CORESET scheduling a PDSCH, the controller is configured to assume that the indication state applied for receiving the PDSCH is the same as an indication state applied on the CORESET for receiving the scheduling PDCCH.

In another embodiment, identifying a first DCI format conveying a DL assignment for scheduling a PDSCH implicitly indicates that the higher layer parameter is set as enabled.

In yet another embodiment, identifying a second DCI format, different from the first DCI format, conveying a DL assignment for scheduling a PDSCH implicitly indicates that the higher layer parameter is set as disabled, and that the associated PDSCH is to be received using the same indication state as that applied on the CORESET for receiving the scheduled PDCCH.

In yet another embodiment, the indication state indicates a spatial QCL information, including a spatial parameter, to be applied for PDSCH reception.

In yet another embodiment, based on identifying that the higher layer parameter is set as disabled for the CORESET scheduling the PDSCH, the controller is configured to derive a QCL linked to a default indication state for receiving the PDSCH scheduled on the CORESET, wherein the default indication state for receiving the PDSCH is set as part of a radio resource control (RRC) configuration of a PDSCH.

Further, the higher layer parameter indicating whether the indication state is present or not present is set per CORESET basis as part of an RRC configuration of a CORESET.

In another embodiment, the higher layer parameter indicating whether the indication state is present or not present is set on a per DCI basis.

In another aspect, a base station includes a controller configured to set a higher layer parameter as enabled or disabled to indicate whether, for scheduling physical downlink (DL) shared channel (PDSCH), an indication state is present in DL control information (DCI) transmitted by a physical DL control channel (PDCCH) on a control resource set (CORESET), wherein the indication state indicates an associated PDSCH antenna port quasi co-location (QCL) parameter. The controller is further configured to, for the higher layer parameter set as enabled to indicate that the indication state is present in the DL DCI, configure the DL DCI to include the indication state. The base station further includes a transceiver configured to transmit the higher layer parameter and the DL DCI to the UE.

In yet another embodiment, a method for operating a base station is provided. The method includes setting a higher layer parameter as enabled or disabled to indicate whether, for scheduling physical downlink (DL) shared channel (PDSCH), an indication state is present in DL control information (DCI) transmitted by a physical downlink control channel (PDCCH) on a control resource set (CORESET), wherein the indication state indicates an associated PDSCH antenna port quasi co-location (QCL) parameter. The method further includes, for the higher layer parameter set as enabled to indicate that the indication state is present in the DL DCI, configuring the DL DCI to include the indication state, and transmitting the higher layer parameter and the DL DCI to the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v14.2.0, "E-UTRA, Physical channels and modulation;" 3GPP TS 36.212 v14.2.0, "E-UTRA, Multiplexing and Channel coding;" 3GPP TS 36.213 v14.2.0, "E-UTRA, Physical Layer Procedures;" 3GPP TS 36.321 v14.2.0, "E-UTRA, Medium Access Control (MAC) protocol specification;" and 3GPP TS 36.331 v14.2.1, "E-UTRA, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
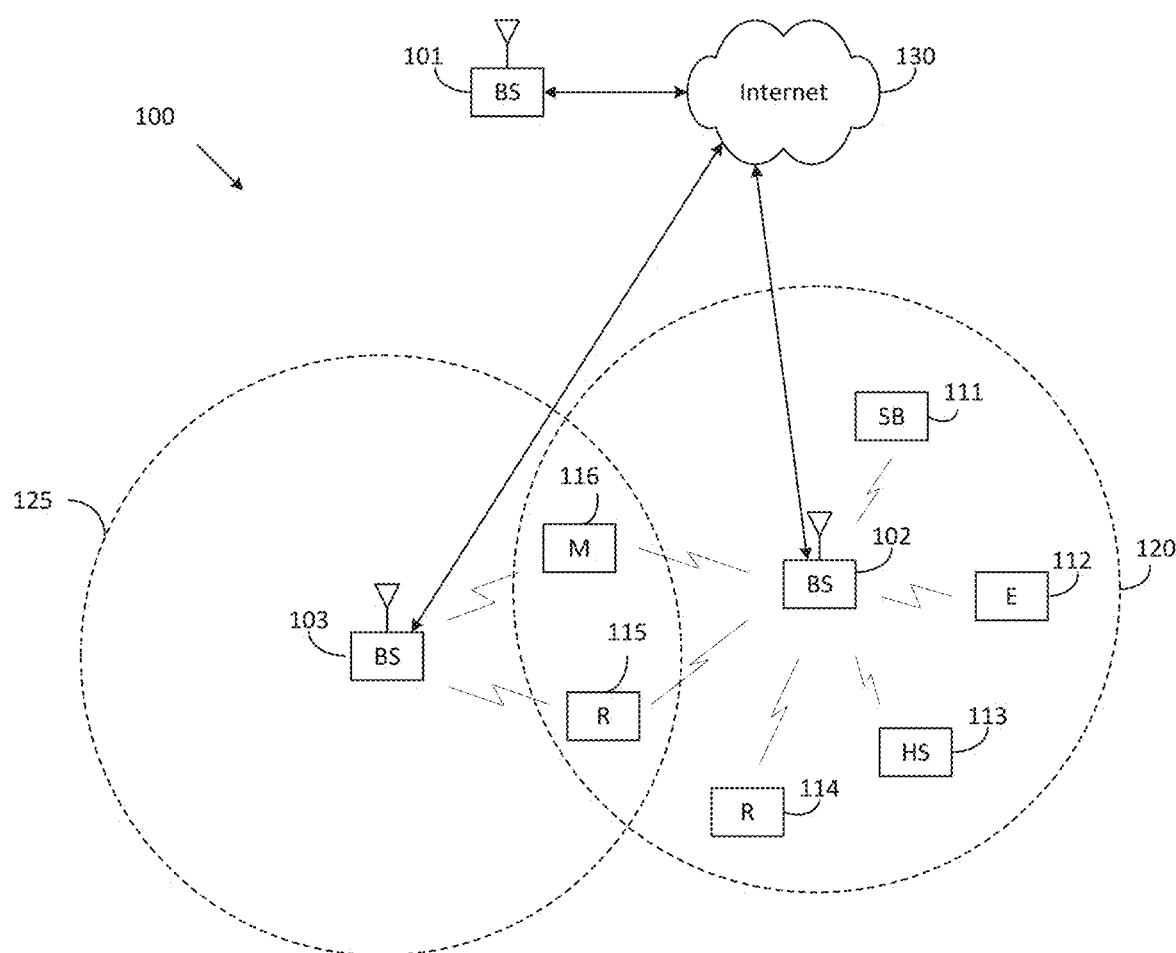
FIG. 1 illustrates an exemplary wireless network according to embodiments of the present disclosure.
Figure 2:
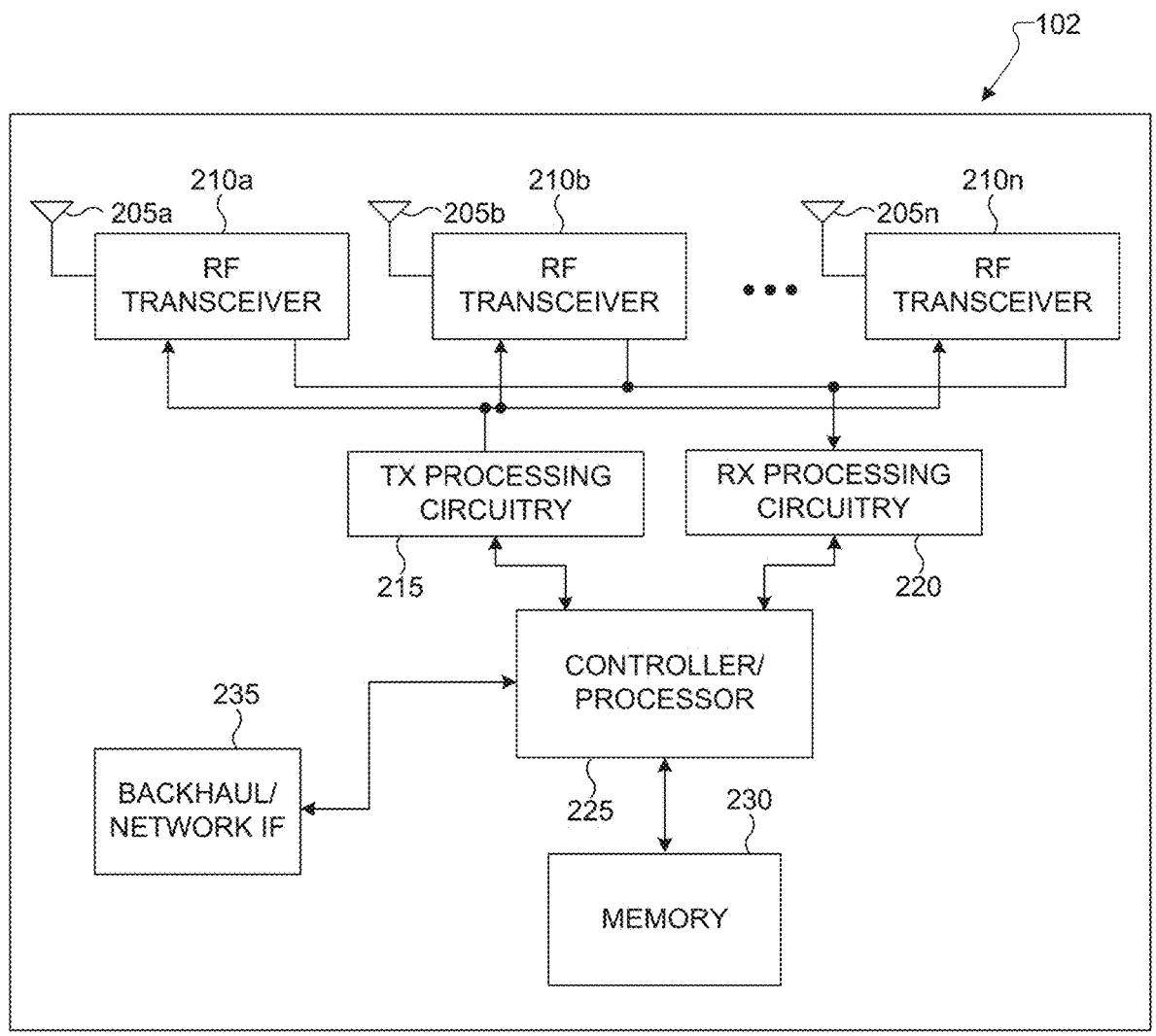
FIG. 2 illustrates an exemplary base station according to embodiments of the present disclosure.
Figure 3:
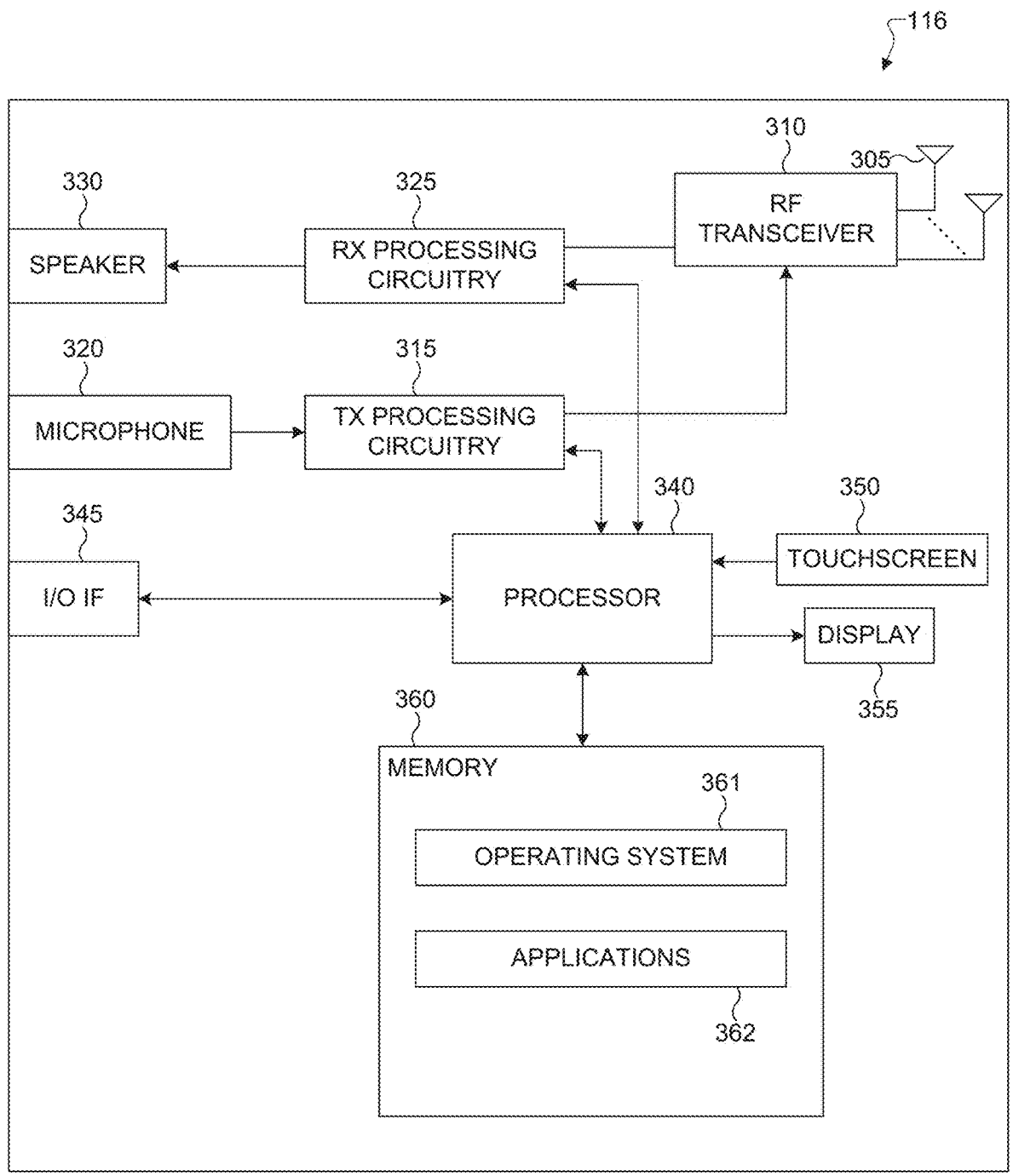
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an exemplary wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient SS block index and timing indication in an advanced wireless communication system. In certain embodiments, and one or more of the eNBs 101-103 includes circuitry, programming, or a combination thereof, for efficient SS block index and timing indication in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-

103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an exemplary eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beamforming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an exemplary UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
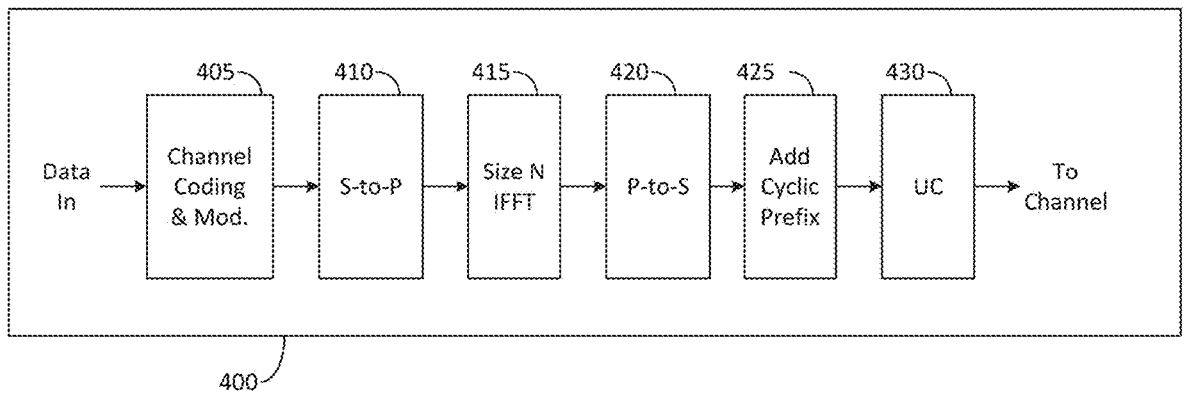
FIG. 4A illustrates an example high-level diagram of an orthogonal frequency division multiple access transmit path according to embodiments of the present disclosure.
Figure 4B:
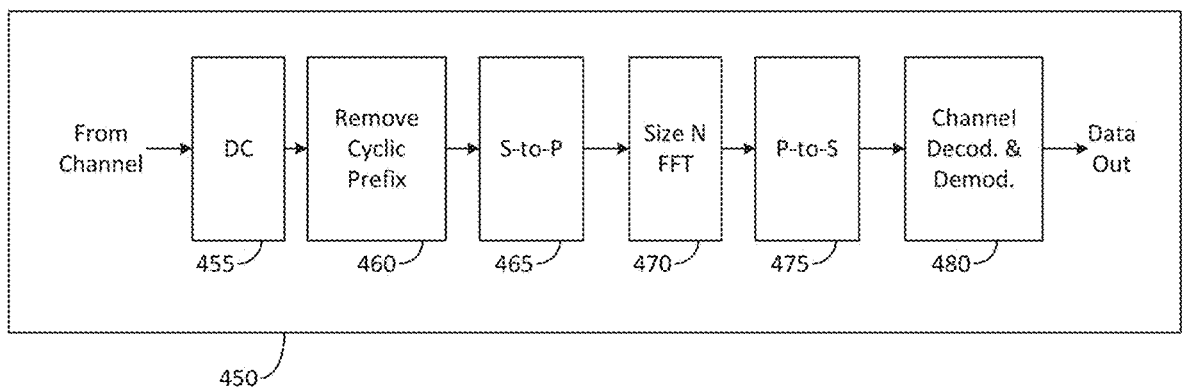
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

Figure 5:
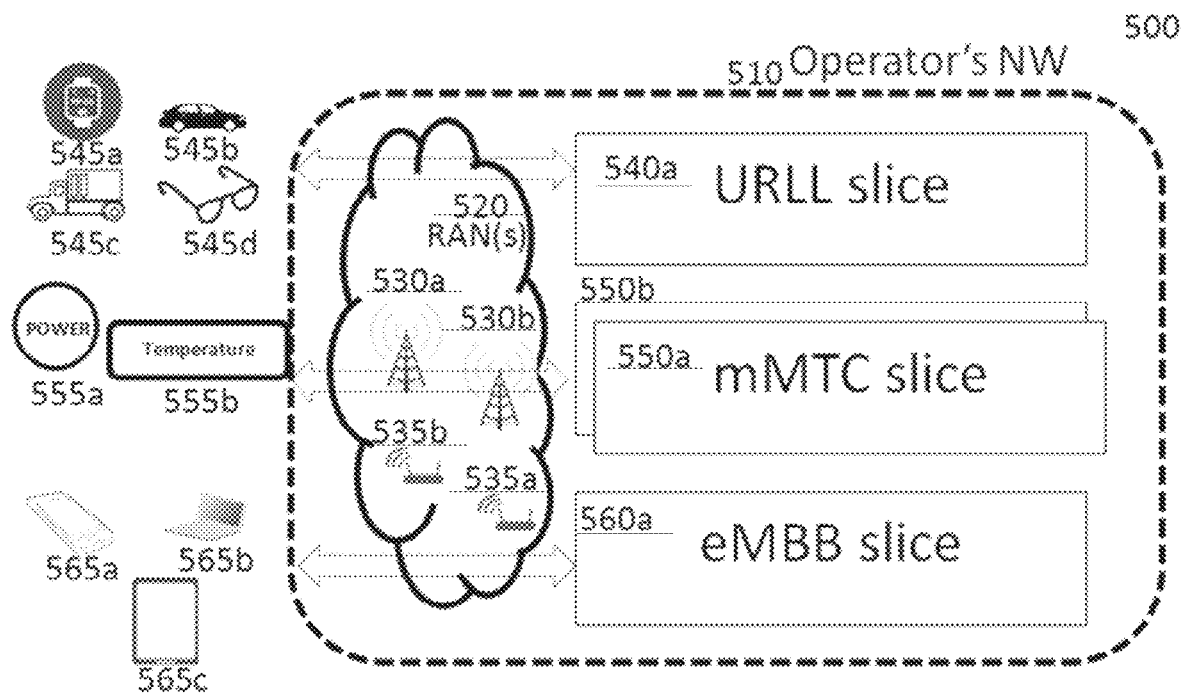
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a scheme to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
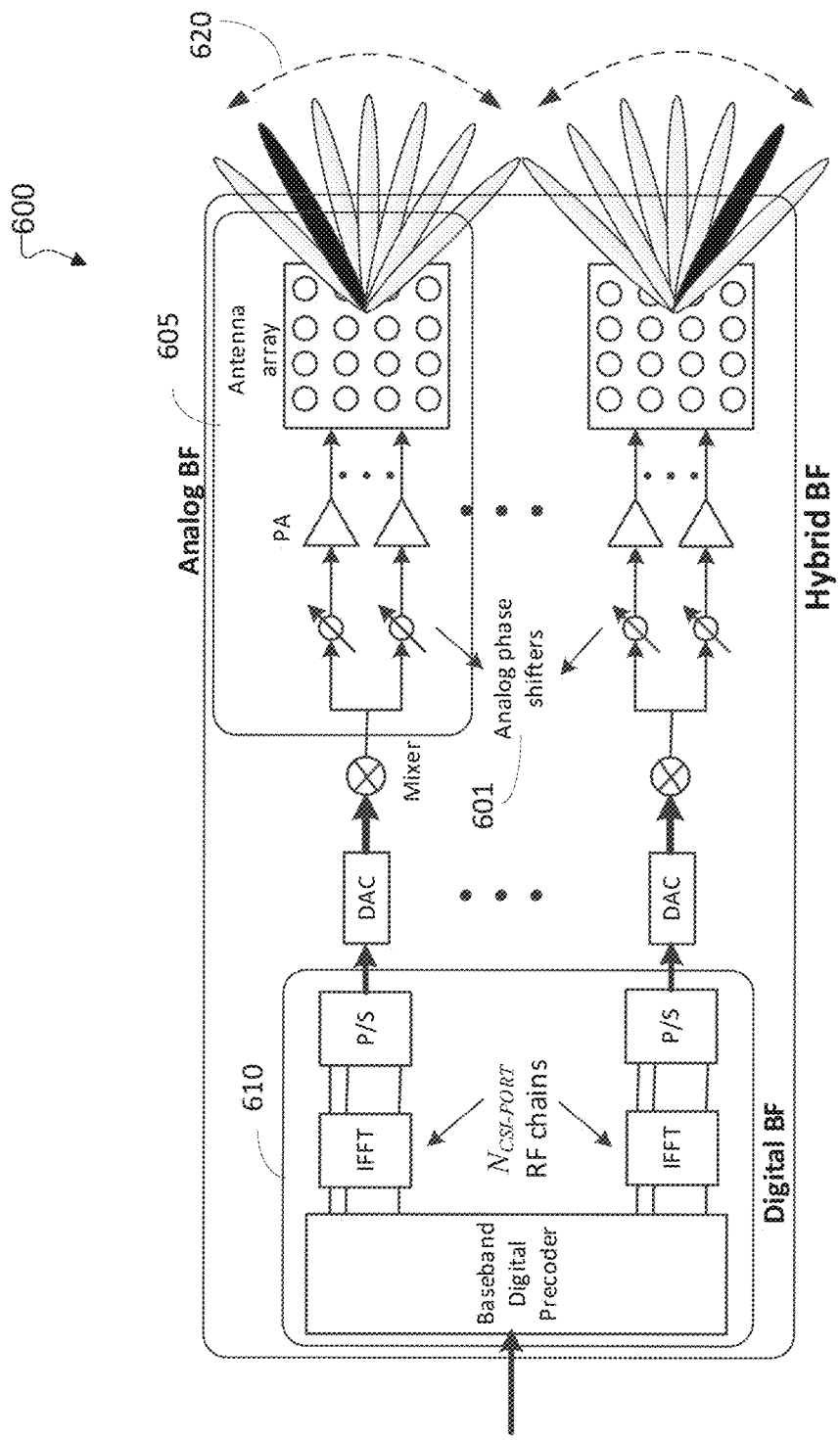
FIG. 6 illustrates an example number of digital chains according to embodiments of the present disclosure.

FIG. 6 illustrates an exemplary number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI\text{-}PORT}$. A digital beamforming unit 610 performs a linear combination across $N_{CSI\text{-}PORT}$ analog beams to further increase precoding gain. While analog beams are wideband (hence not frequency-selective), digital precoding can be varied across frequency sub-bands or resource blocks.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may be feasible for a gNB to provide coverage with a single transmit beam, i.e., ensure adequate received signal quality at the UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

This disclosure considers the beam management procedure for the physical downlink shared data channel (PDSCH) and the physical downlink control channel (PDCCH) of the next generation cellular systems.

In some embodiments of this disclosure, the two terminologies, "RS for mobility" and "beam reference signals (BRS)" are used interchangeably. In some embodiments of this disclosure, CSI refers to at least one of CQI, PMI, RI, RSRP and a CSI-related resource index (e.g., beam index, CSI-RS resource index). In some embodiments of this disclosure, BSI refers to at least one of: (1) beam index that can be derived from CSI-RS port index, beam resource index/time unit index and B-CSI-RS resource index; (2) RSRP and/or RSRQ of the reported beam. In some embodiments of this disclosure, it is assumed that UE is configured with a reference numerology (comprising OFDM symbol length and subcarrier spacing) at least for PDSCH reception. In some embodiments of this disclosure, the two terminologies, "beam resource" and "time unit" are used interchangeably.

In this disclosure, a QCL resource may refer to a beam, an antenna port (across all the configured time units), a group of antenna ports corresponding to an RS resource, a CSI-RS resource, or a combination of an antenna port and a time unit of an RS resource. In this disclosure, an RS resource may refer to a CSI-RS resource, BRS (multi-beam mobility RS, can be cell-specifically configured, may correspond to PSS, SSS, PBCH DMRS, DMRS, CSI-RS or a newly designed RS), a set of DMRS ports, etc. In this disclosure, an RS setting may refer to a set of RS resources. In this disclosure, a time unit may correspond to a block of (consecutive) one or more OFDM symbols according to a configured numerology, on which UE can assume that a same QCL parameter is applicable to each antenna port (and/or in which the port-coherency holds). In this disclosure, a Tx beam (ID) may refer to a QCL resource of an RS resource, wherein the RS resource can be BRS or CSI-RS. Tx beams of an RS resource or an RS setting can be indexed with unique IDs, referred to Tx beam IDs. For example, if N Tx beams are available in an RS resource or an RS setting, N unique IDs can be allocated to these N individual Tx beams. In this disclosure, an Rx beam ID refers to an index that can be commonly understood by UE and gNB, for UE's Rx beamforming operation. A UE can be equipped with a single or multiple digital Rx chains. When the UE is equipped with a single Rx chain, a first Rx beam ID corresponds to a first Rx beam that is steered to a first angle; a second Rx beam ID corresponds to a second Rx beam that is steered to a second angle; and so on. When the UE is equipped with N digital Rx chains, the first Rx beam ID corresponds to a first set of N Rx beams that are steered to a first set of N angles; the second Rx beam ID corresponds to a second set of N Rx beams that are steered to a second set of N angles; and so on. Here, N is a positive integer. As an Rx beam ID may be associated with multiple Rx beams (especially in multiple digital chain case), an Rx beam ID may alternatively referred to an Rx mode.

In this disclosure, Rx-beam, Rx mode and Rx-beam related QCL parameters are used interchangeably, and refer to average AOA, ASD or antenna correlations. When an Rx beam of a first QCL resource can be inferred by that of a second QCL resource, the first and the second QCL resources are said QCL'ed in Rx-beam/Rx mode. In this disclosure, a set of QCL parameters refers to a combination of Rx-beam related parameters (average angle of arrival, arrival angle spread, Rx antenna correlation, etc.), delay and timing related parameters (Rx timing, delay spread, average delay), Doppler related parameters (average Doppler, Doppler spread), and the like.

Directional beamforming will be used in mmWave-based cellular systems such as 3GPP-NR to extend coverage and compensate for increased propagation losses, blockage effects and changes in UE orientation. The transmitter gNB chooses its transmit beam for directing its transmission energy in the direction of one or more intended users. The receiver UE chooses its receive beam in a manner which maximizes the post-processed SINR while receiving the transmitted beam [in practice, the gNB and UE may so choose to split their beamforming into a combination of analog beamforming (via RF phase shifters) and digital beamforming stages.].

To assist the UE in determining its RX beam, a beam sweeping procedure is employed including the gNB transmitting a set of transmit beams to sweep the cell area and the UE measuring the signal quality on different beams using its receive beams. To facilitate candidate beam identification, beam measurement and beam quality reporting, the gNB configures the UE with one or more RS resource (e.g. SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB configures the UE with a set of TX-RX beam pairs for reception of PDCCH and/or PDSCH. We refer to the indication of a TX-RX beam pair or a transmit and receive spatial filter configuration (state) as an Indication State (IS).

Figure 7:
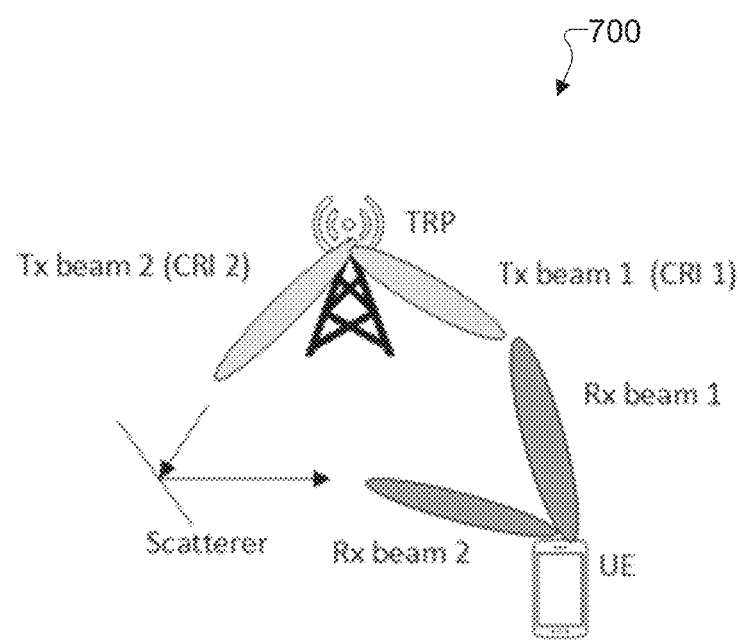
FIG. 7 illustrates exemplary beam pair links between a base station and a UE according to embodiments of the present disclosure.

FIG. 7 illustrates exemplary beam pair links 700 between gNB and a UE according to embodiments of the present disclosure. The embodiment illustrated in FIG. 7 is for illustration only. Other embodiments are used without departing from the scope of the present disclosure.

From the gNB perspective, an IS corresponds to a transmit (TX) beam (or a TX spatial filter configuration) transmitted on an set of time/frequency/spatial (antenna port) resources. From the UE perspective, the IS refers to a receive (RX) beam (or an RX spatial filter configuration) that is used to receive the TX beam. The IS can also refer to a TX-RX beam pair, such that the same RX beam for two different Tx beams correspond to two ISs. For providing reliability and spatial multiplexing gains, the gNB can configure the UE with multiple ISs following a set of beam sweeping and beam refinement procedures during both the UE continuously measures and reports the signal strength of one or more TX-RX beams to its serving the gNB. As an example, shown in FIG. 7, two TX-RX ISs, the first associated with CSI RS resource CRI 1 and the second associated with CSI RS resource CRI 2, are established.

This disclosure provides methods for configuration and maintenance of ISs in a mmWave system.

1) The UE may assume a default IS with IS value equaling 0: the default IS may correspond to the Tx-Rx beam pair corresponding to the SS Block associated with RACH procedure during initial access.

2) RRC signaling is used to add one or more ISs (in addition to the IS) at the UE.

3) For each IS, including the default IS, the UE is provided a set of RS indexes belonging to a certain RS type (e.g., periodic (P)/Semi-static or semi periodic (SP)/aperiodic (AP) CSI-RS resource, SS Block Time Indexes). If the IS corresponds to the default IS, the resource set can be a set of RS indexes (e.g., CRI, SS Block Time Index) which are spatially quasi co-located (QCL-ed) with the SS block associated to the default IS. Each CSI-RS resource indicator (CRI) corresponds to either a P/SP/AP CSI-RS resource. As an example, a.IS=0 can correspond to the default IS corresponding to SS block determined during initial access. b.IS=1 can correspond to a set of P CSI-RS resources. c.IS=2 can correspond to a set of SP CSI-RS resources. d.IS=3 can correspond to a set of AP CSI-RS resources.

Note that the indexes can be quite flexible and associated for providing quasi co-location (QCL) references for either PDSCH or PDCCH. In one method, for example, one set of indexes can correspond to RS resource sets for beam indication for PDSCH. And a second, possibly different set of indexes can correspond to RS resource sets for beam indication for PDCCH.

Figure 8:
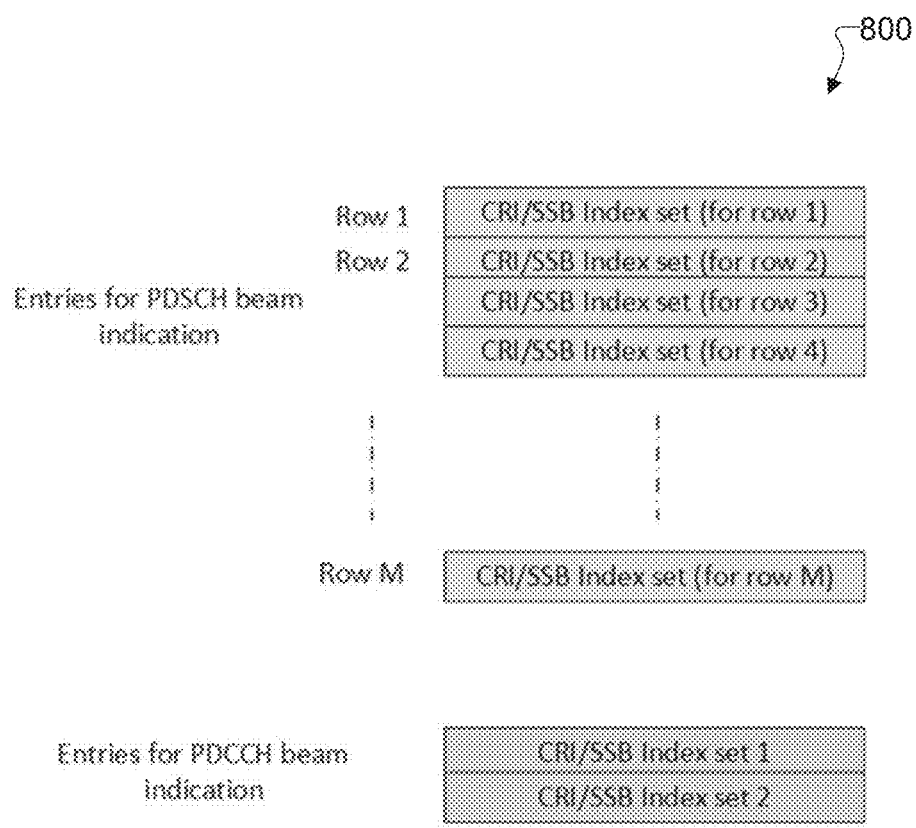
FIG. 8 shows an example RRC signaling of RS resource sets for different beam indicator states for PDSCH and PDCCH according to embodiments of the present disclosure.

FIG. 8 shows an exemplary RRC signaling 800 of RS resource sets for different beam indicator states for PDSCH and PDCCH according to embodiments of the present disclosure. The embodiment illustrated in FIG. 8 is for illustration only. Other embodiments are used without departing from the scope of the present disclosure.

4) Based on UE measurement reports, the network can indicate to the UE which set of RS should be used as spatial QCL reference for a given state. This set is a subset of the RS resource set in 3) for that state.

4) a. In one method, the indication of the subset of RS within the resource set are used as spatial QCL reference is provided via MAC CE signaling either implicitly or explicitly.

4) a. i. Implicit: the MAC-CE used for activating RS implicitly indicates the corresponding IS value. In one method, upon reception of the activation MAC CE used to activate an CRI corresponding to a SP CSI-RS resource, the UE infers the corresponding IS value by checking whether that index lies in the set of RS indexes associated with that IS. For example, RRC signaling may configure IS=1 with a set of SP CSI-RS resources {CRI 1, CRI 2, . . . CRI M}. Based on UE measurement reports, the network may determine that CRI 2 may be the best beam for that UE for IS=1. The network can send an activation MAC CE activating CRI 2. Upon receipt of the MAC CE with CRI 2, the UE looks-up which IS, CRI2 is a set member of. Thus the UE infers IS=1.

4) a. ii. Explicit: the MAC-CE contains both the indicator state and the P/SP CSI-RS resource index. Based on the above example, the network can send a MAC CE containing IS=1 and CRI=2. Then, the UE assumes that IS=1 is associated with spatial QCL reference corresponding to CRI=2.

4) b. In a second, different method, if a DCI is used to trigger an AP CSI-RS resource Z and if that DCI message contains an IS equaling i, then the UE assumes that that AP CSI-RS resource is spatially QCL-ed with the set of RS resources Y already configured as QCL references for that IS.

4) b. i. If the DCI triggers a tx beam sweep, the UE may assume that the Rx beam which it uses to receive Y (corresponding to IS=i) can be used to receive that AP CSI-RS resource Z.

4) b. ii. If the DCI triggers a rx beam sweep, the UE may assume that the Rx beam which it uses as initial beam during the rx sweep corresponds to the beam used to receive Y.

4) b. iii. If the UE subsequently receives a DL assignment indicating IS=i, the UE may assume that QCL reference to correspond to the most recent measurement associated with IS=i, namely the AP CSI-RS resource Z. The UE also chooses its Rx beam based on the most recent measurement on Z.

5) For each RS lying in a given IS, the network can optionally provide a set of QCL relations between that RS resource (referred below as target RS) and a reference (source) RS. The relations can include the following embodiments (also shown in Table 1 below):

5) a. RRC signaling: If configured, at least spatial QCL relation between SS Block (source RS) and P/SP CSI-RS (target RS) is signaled by RRC.

5) b. RRC signaling: If configured, at least spatial QCL relation between a P/SP CSI-RS resource (source RS) and another (different) P/SP CSI-RS resource (target RS) is configured by RRC.

5) c. DCI signaling: At least spatial QCL relation for an AP CSI-RS resource (target RS) is provided through an indicator state in a DCI message which triggers that resource. E.g., to indicate QCL relation between AP CSI-RS and a SSB/P/SP/AP CSI-RS resource Y, the DCI message provides the indicator state associated with Y.

TABLE 1

| Target RS | Reference RS | Method of Signaling |
| --- | --- | --- |
| P/SP CSI-RS | SS Block | RRC |
| P/SP CSI-RS2 | P/SP CSI-RS1 | RRC |
| AP CSI-RS | AP/P/SP CSI-RS or SSB | Indicator state (associated with index of AP/P/SP CSI-RS) in DCI triggering AP CSI-RS |

In the following paragraphs, we present further details of configuration for PDSCH and/or PDCCH beam indication. Two methods are discussed: in the first method, RRC signaling provides a table comprising of a set of ISs and for each IS value, a set of RS indexes, which provide QCL reference. For indicating PDSCH beams, the spatial QCL reference is signaled dynamically through an IS field within the corresponding DL assignment DCI. For PDCCH beam indication, RRC configures each UE-specific CORESET with an IS value; the IS value determines which RX beam (e.g., spatial QCL reference) is linked to the CORESET reception. In either case, the UE looks up the RRC configured table in order to determine the QCL parameters linked to the IS linked to the PDSCH/CORESET (PDCCH).

In a second different method, the spatial QCL parameters for PDSCH and PDCCH are configured independently. For example, for PDSCH beam indication, similar to the first method, a set of indicator states and a set of RS resources (one per indicator state) can be configured for providing QCL information. For PDCCH beam indication, instead of signaling indicator states, each UE-specific CORESET is configured with a set of RS resources providing QCL reference.

Indicator State Based Beam Indication Framework for PDSCH and PDCCH

This section provides detailed configuration procedures for an indicator state based framework for PDSCH and PDCCH beam indications.

Figure 9:
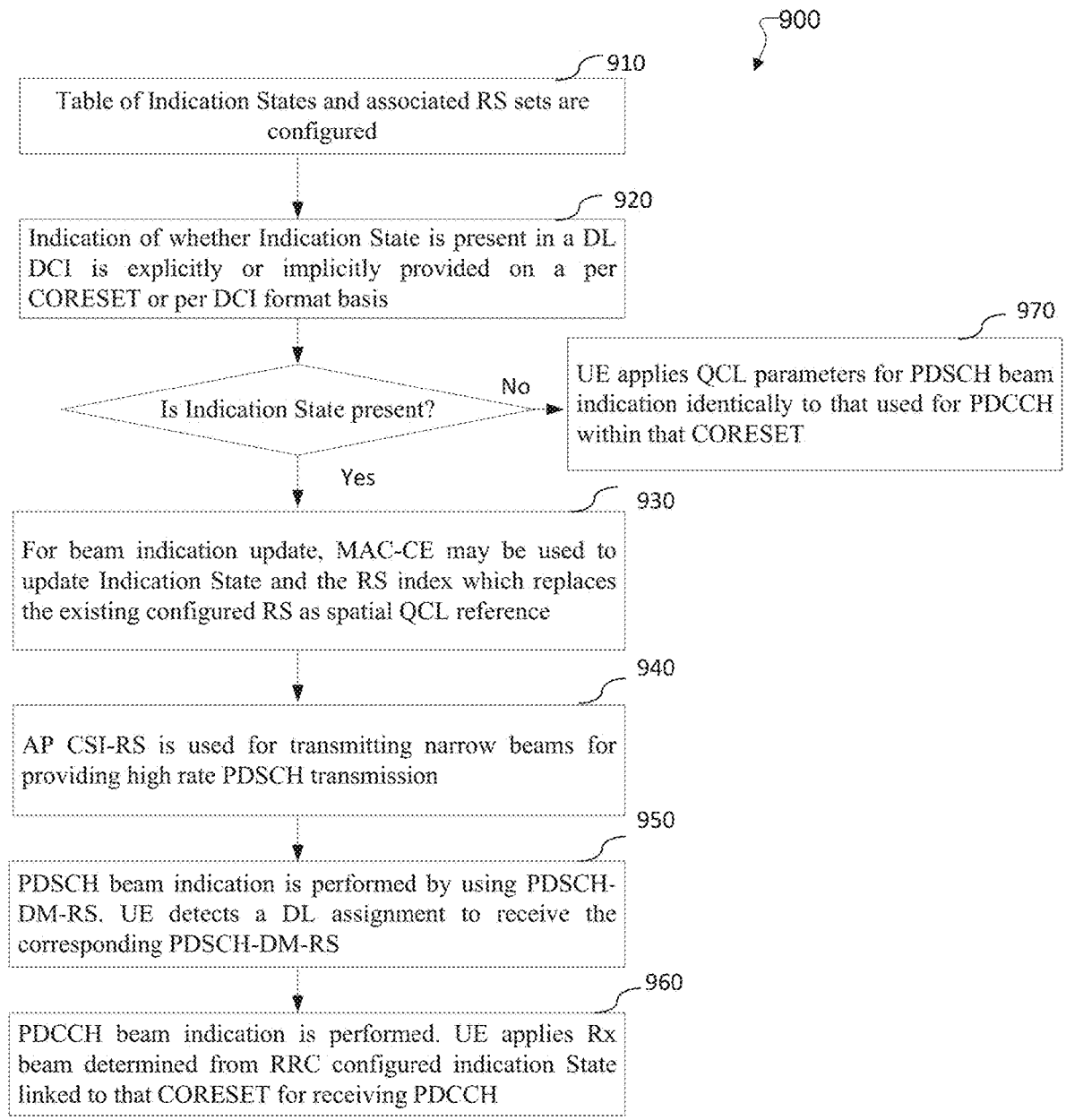
FIG. 9 illustrates an exemplary flowchart for PDSCH and PDCCH beam indications according to embodiments of the present disclosure.

FIG. 9 illustrates an exemplary flowchart 900 for PDSCH and PDCCH beam indications according to embodiments of the present disclosure. The embodiment illustrated in FIG. 9 is for illustration only. Other embodiments are used without departing from the scope of the present disclosure.

In the operation 910, for RRC configuration of indicator states, a network configures a table of ISs and their associated RS set(s) via an RRC signaling. In one method, each RS set includes one or more RS, each of which provides reference for one or more QCL parameters including Spatial/Delay/Doppler/Average gain). At least for providing spatial QCL reference, the RS within an RS set, linked to an IS value, is drawn among the following: one or more candidate SS block time indexes; one or more candidate P CSI-RS resource indexes; or one or more candidate SP CSI-RS resource indexes. UE assumes error case if it receives a DL assignment which includes an IS for which all its linked SP CSI-RS resources are inactive.

Refer to below Table 2 for an exemplary RRC configuration. In an alternative construction, the RS set configuration may only contain the resource (RS) setting index, in which case all the CRIs or SSB indices which belong to the RS set(s) within that setting index are configured for the IS state by default. In an alternative construction, a pair of resource settings (or, alternatively, multiple pairs of two RS resources each selected from a first setting and a second setting), may be configured for two different QCL parameters for each IS state. For example, UE may assume that RS in a first resource setting is a QCL reference with respect to spatial parameters; and RS in a second resource setting is a QCL reference with respect to all the other QCL parameters such as delay, Doppler, average gain, and the like.

TABLE 2

RRC configuration of indication states

| Indicator State Index | RS Set 1 | Comment/use-case |
|---|---|---|
| 0 | {CRI 1}, RS Setting 1, Type = P CSI-RS, QCL Type: All QCL parameters | |
| 1 | {CRI 2, CRI 3}, RS Setting 2, Type = SP CSI-RS, QCL Type: All QCL parameters | In this state, the UE can receive coarse beam (wide) beams in the angular coverage of {CRI2, CRI3} for PDCCH and/or PDSCH fall back reception |
| 2 | {CRI 2, CRI 3}, RS Setting 2, Type = SP CSI-RS, QCL Type: All QCL parameters | In this state, the UE can receive refined (narrow) beams in the angular coverage of {CRI2, CRI 3} via triggering AP CSI-RS beams which are pointing within the angular coverage of CRI 2. |

TABLE 2-continued

RRC configuration of indication states

| Indicator State Index | RS Set 1 | Comment/use-case |
|---|---|---|
| 3 | {SS Block Time Index 24}, RS Setting 3, Type = SS Block, QCL Type = All QCL parameters | |

Per the above method, it may not be preferred for AP CSI-RS to provide QCL reference for an IS. The reason is that it potentially the number of pool of available RS indexes (candidate beams) is much larger than the available number of indicator states; in such a case, it may be desirable not to have an RRC configured AP CSI-RS resource (beam). Rather, AP CSI-RS resources can be used opportunistically via dynamic (DCI) signaling to refine different coarse beams at different time instants. This can be done by dynamically indicating in each time instant, the QCL relation between that AP CSI-RS resource and a particular resource corresponding to a coarse beam.

In the operation 920, the network via an RRC signaling configures one IS value to be associated with each UE-specific CORESET for an RRC Configuration for PDCCH beam indication. Refer to the below Table 3 for an example. The UE can look up the RRC configured table to determine the RS set providing the QCL parameters (including spatial) for receiving the PDCCH DM-RS of that CORESET. In one embodiment, a 1-bit field [enableDciTriggeredSpatialQclUpdate] may be optionally provided per UE-specific CORESET. If this parameter is enabled (set to 1), then the QCL reference (including spatial Rx parameters) for that CORESET may be updated dynamically based on measurement on a DCI triggered AP CSI-RS resource. For example, RRC may configure a UE-specific CORESET whose QCL reference corresponds to a DL RS index with CRI-5. Suppose an AP CSI-RS is subsequently triggered via DCI such that the reception of the triggered AP CSI-RS employs QCL parameters identically to that used for that UE-specific CORESET; the QCL reference for the trigger of the AP CSI-RS can be provided either by explicitly signaling the DL RS index or by signaling the IS having a reference to CRI=5. Following measurement on that AP CSI-RS, if enableDciTriggeredSpatialQclUpdate is set to 1 for that CORESET, the UE subsequently assumes that the spatial QCL reference for that CORESET is now provided by that AP CSI-RS resource. More details of the UE behaviors with respect to the state of enableDciTriggeredSpatialQclUpdate are described in the below operation 960. If the enableDciTriggeredSpatialQclUpdate field is disabled (set to 0), the QCL reference for that CORESET is determined via the most recent RRC/RRC+MAC-CE signaling received for that CORESET.

TABLE 3

CORESET configuration

| CORESET Index | DL Assignment Parameters | PDCCH Beam Indication Parameters | Comment/use-case |
|---|---|---|---|
| 0 | includeIndicatorStateInDlAssignmentDci = 1 (default: 1, IS field included for PDSCH reception, i.e., different resource (beam) index can be indicated for PDSCH and PDCCH reception) | Indicator State Index = 3. enabledDciTriggeredSpatialQclUpdate = 0 (No update of PDCCH RX beam based on AP CSI-RS). | CORESET 0 reception assumes SS Block (Block Time Index = 24) as QCL reference |
| 1 | includeIndicatorStateInDlAssignmentDci = 0 (default: 1, IS field not included for PDSCH reception, i.e., same resource (beam) index is indicated for PDSCH and PDCCH reception) | Indicator State Index = 2. enabledDciTriggeredSpatialQclUpdate = 1 (Enable update of PDCCH Rx beam corresponding to the indicated RS resource(s) based on the measurement on AP CSI-RS for the same indicated RS resource(s)). | CORESET 1 reception assumes {CRI 2, CRI 3}, of type SP CSI-RS as QCL reference. The QCL reference for the CORESET 1 can be updated dynamically via DCI triggering of AP CSI-RS. |

In the operation 920, the network performs a configuration of presence/absence of IS field in DCI. As part of the configuration of beam indication, the UE can be informed whether or not the dynamic beam indication for PDSCH is enabled or not. If dynamic beam indication is enabled, following completion of DCI decoding, if the UE has a DL assignment, the UE reads the IS field in the scheduling DL DCI to infer which QCL parameters, including spatial Rx parameters, to apply for PDSCH reception. If dynamic beam indication is disabled, the UE can apply a known (e.g. higher-layer configured) set of QCL parameters for PDSCH reception and the DCI carrying the DL assignment does not carry a IS field. The advantage behind not having dynamic beam indication is that it is useful in scenarios where a fixed PDSCH beam suffices (no dynamic indication of QCL parameters is necessary) or in scenarios where it is desired that PDSCH follow the same beam as that used for another channel (e.g., PDCCH) or signal (e.g., SSB). The latter scenario can be used to provide fall back PDSCH reception i.e. PDSCH follows same beam as PDCCH. An additional advantage with disabling dynamic beam indication for PDSCH (e.g., via a pre-defined/higher-layer configured PDSCH beam indication) is that the UE can apply that beam for purposes of buffering (potential) PDSCH samples, even if DCI decoding is not complete. If the UE were to determine its spatial Rx parameters via IS field in the scheduling DCI, the UE does not know which RX beam to apply for buffering potential PDSCH samples until the instant the DCI decoding is complete. This places some constraints at the gNB in terms of the minimum time between the last symbol of the scheduling PDCCH and the first symbol of the PDSCH.

The indication of whether IS field is present in a DL DCI can be provided on a per CORESET or per Search Space or per DCI format basis. For example, if a UE is configured with M>1 CORESETs, a subset m of the M CORESETs can be configured with IS field absent and the remaining M−m CORESETs can be configured with IS field present. On any CORESET for which IS field is configured absent, as part of the blind decoding for determining whether or not a DL assignment in present in a given slot, the UE calculates the DCI payload size assuming IS field is absent in the assignment DCI.

Figure 10:
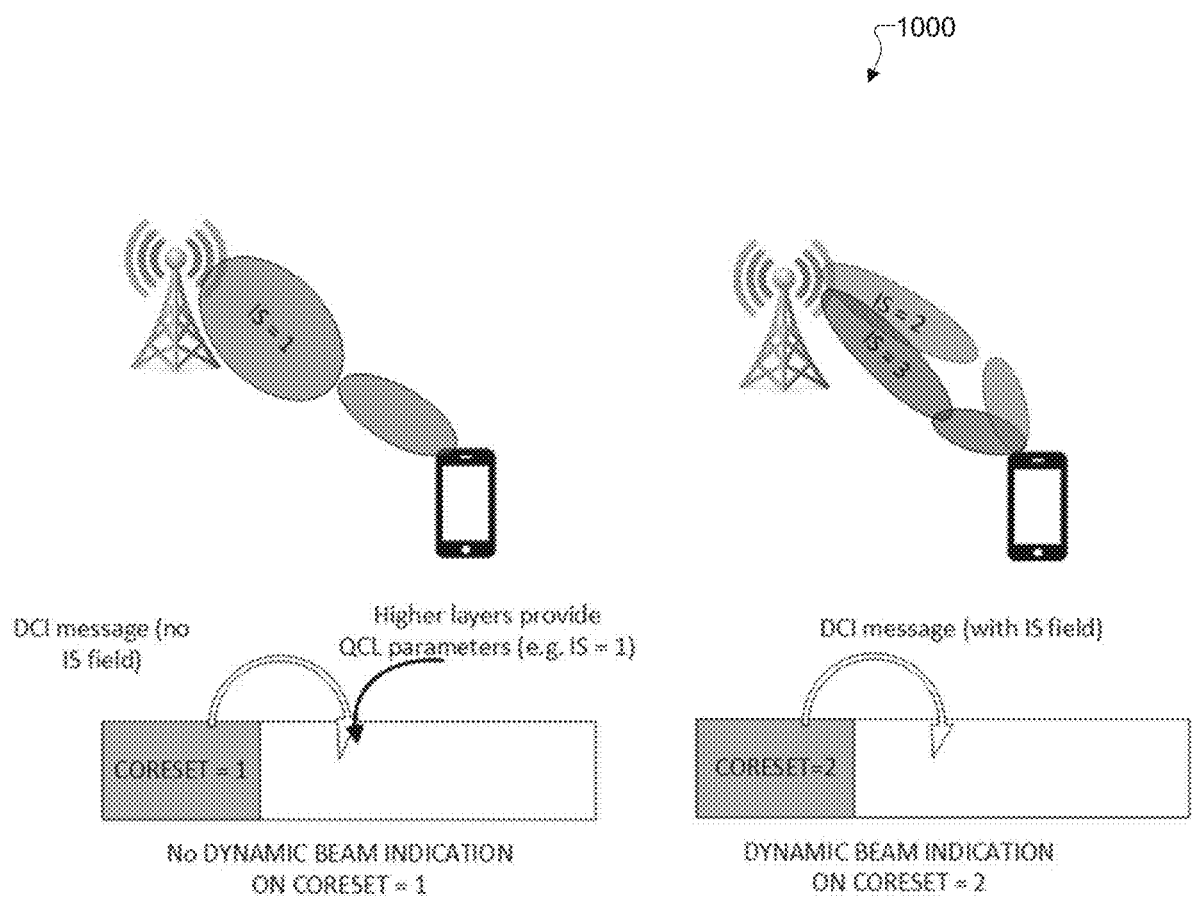
FIG. 10 illustrates an exemplary per-CORESET based configuration of presence/absence of IS field in DCI according to embodiments of the present disclosure.

FIG. 10 illustrates an exemplary per-CORESET based configuration 1000 of presence/absence of IS field in DCI according to embodiments of the present disclosure. The embodiment illustrated in FIG. 10 is for illustration only. Other embodiments are used without departing from the scope of the present disclosure.

As shown in FIG. 10 as an example, the CORESET=1 is configured without IS in DCI, no dynamic beam indication for PDSCH occurs. On CORESET=2, since dynamic indication for PDSCH is configured, the IS field in the DL DCI can be used to switch the PDSCH beams from one DL assignment to another within that CORESET.

As part of higher-layer configuration, the UE can be provided the following information on a per CORESET basis or a per-Search Space (SS) basis or a combination thereof: 1. A parameter indicating that the IS field is present in a DL assignment DCI scheduled within that CORESET/SS and that the QCL parameters for PDSCH reception are provided via the IS state present in any DCI containing a DL assignment; and 2. A parameter indicating that the IS field is absent in a DL assignment DCI scheduled within that CORESET/SS. If the IS field is absent, then the UE should follow a pre-configured behavior (see sub-bullets below) for determining QCL parameters for PDSCH reception. 2. 1 The behavior can be to use identical set of QCL parameters as that used for receiving PDCCH. 2. 2 The behavior can be to apply a higher-layer configured default set of QCL parameters for PDSCH reception.

In the following paragraphs, some embodiments for signaling the presence/absence of a beam indication field are provided.

A higher-layer parameter can signal the presence/absence of a beam indication field (or the IS value used to derive the QCL reference) within a DCI message. The signaling can be on a per CORESET configuration or per DCI format configuration. In one example, for CORESETs used for initial access (e.g., RAR and SIB reception), e.g., CORESETs configured in PBCH (MIB) and RMSI(SIB1) for type0 and type 1 common search spaces, the beam indication field is absent. For RRC configured CORESETs, the existence of the indicator field is explicitly configured by means of includeIndicatorstateInDci, e.g., per DCI format or per search space.

In case of configuration on a per CORESET basis, the presence/absence of beam indication field can be indicated during RRC configuration of that CORESET. In one embodiment, a Boolean includeIndicatorStateInDlAssignmentDci is defined within the UE-specific CORESET RRC configuration such that if this Boolean is enabled (resp. disabled) for that CORESET, any UE-specific DL DCI assignment message in the PDCCH within that CORESET includes (resp. does not include) an IS field. If the includeIndicatorStateInDlAssignmentDci is set to off (Disabled) on a given CORESET, the UE applies the QCL parameters (including spatial RX parameters) identically to that used for receiving the PDCCH (carrying the DL assignment) on that CORESET in the operation 970. In another embodiment, if the includeIndicatorStateInDlAssignmentDci is set to off (Disabled) on a given CORESET, the UE can apply a higher-layer configured set of QCL parameters (including spatial RX parameters) for receiving potential PDSCH via that CORESET. The higher-layer configured set of QCL parameters can be the same or different across CORESET (s) for which includeIndicatorStateInDlAssignmentDci is set to off (Disabled). In one embodiment, the higher layer configuration can provide a default IS state; the UE derives its QCL parameters linked to that default IS state for receiving PDSCH on one or more CORESETs for which the IS field is configured absent within DL-related DCI. On the other hand, if that CORESET is configured with IS state present within the DCI (includeIndicatorStateInDlAssignmentDci is set ON), the UE expects to derive its QCL parameters for PDSCH beam indication via the IS field in the DCI carrying the DL assignment within that CORESET. In a second different embodiment, a Boolean includeIndicatorstateInDci is defined within the CORESET RRC configuration such that if this Boolean is enabled (respectively disabled), any DCI message included within a UE-specific PDCCH within that CORESET includes (resp. does not include) an IS field. In a third embodiment, the presence/absence of a beam indication field can be configured per DCI format. For example, the configuration can such that for DL assignment DCI formats, the beam indication field can be configured "absent" whereas on UL DCI formats, the beam indication field can be configured as "present".

In an alternative embodiment, the existence of the beam indication field within a DCI message is implicitly indicated via the CORESET type. For example, the beam indication field is on (included) for DCIs in the RRC-configured CORESET; while the beam indication field is absent for DCIs in the MIB-configured CORESETs. In an alternative embodiment, the existence of the beam indication field is implicitly indicated by DCI types and/or RNTI types. In one example, the beam indication field is included in the DCI scheduling a PDSCH based on a normal TS; the field is absent in the DCI scheduling a PDSCH based on a fallback TS (or a compact DCI). In another example, the beam indication field is included in the DCI including a first type of RNTI (e.g., C-RNTI), and the field is absent in the DCI including a second type of RNTI (e.g., SI-RNTI, temporary C-RNTI, M-RNTI, P-RNTI, RA-RNTI, etc.).

In a third embodiment, higher-layers can signal the presence/absence of an IS field on a per search space (SS) basis. This signaling can be performed separately or jointly with the monitoring occasion for that SS. If a SS is configured with IS=ON (IS field is present), then on a monitoring occasion corresponding to that SS, the UE assumes presence of IS field within a DL assignment DCI scheduled on that UE-SS. Following DCI decoding on that SS, the UE subsequently determines the QCL parameters for PDSCH to be derived from the DL RS index (es) corresponding to the IS field in the DL assignment DCI. On the other hand, if that SS is configured with IS=OFF (IS field is absent), then on a monitoring occasion for that SS, the UE applies the QCL parameters (including spatial RX parameters) for PDSCH identically to that used to receive the scheduling PDCCH, if the scheduling PDCCH is sent via that SS. Since IS=OFF for that SS, during the blind decoding procedure for that SS, the UE can assume that the scheduling DCI does not contain an IS field or alternatively ignore the IS (if present) in a scheduling DCI. In a related embodiment, if that SS is configured with IS=OFF, higher layer can configure the UE with a default set of QCL parameters for receiving PDSCH if scheduled via that search space. The higher-layer configured set of QCL parameters can be the same or different across SS (s) for which includeIndicatorStateInDlAssignmentDci is set to off (or presence of IS is Disabled). In one embodiment, the higher layer configuration can provide a default IS state; the UE derives its QCL parameters linked to that default IS state for receiving PDSCH on one or more SSs for which the IS field is configured absent within DL-related DCI. The UE-SS configuration can also provide an optional priority index, ranked from 1 (=highest priority). Thus, if the UE is configured with multiple overlapping SS, the UE applies the assumptions for presence/absence of IS field based on the search space with highest priority.

Figure 11:
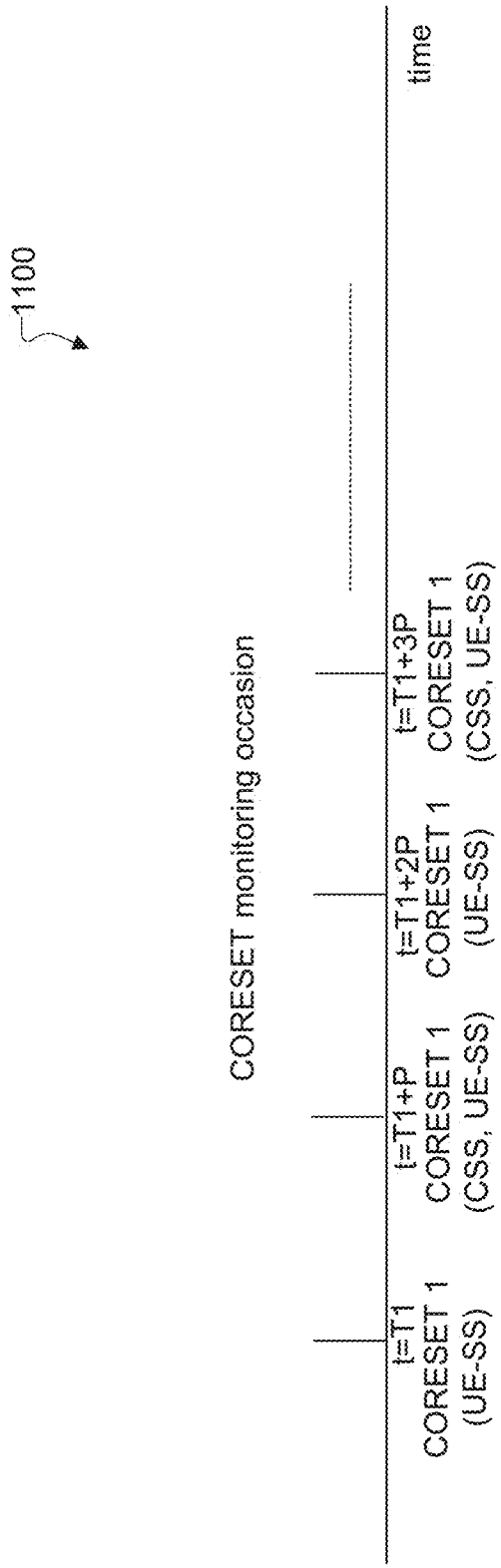
FIG. 11 illustrate an exemplary CORESET monitoring occasion including UE-SS only or overlapping UE-SS and common search space (CSS) according to embodiments of the present disclosure.

FIG. 11 illustrate an exemplary CORESET monitoring occasion 1100 including UE-SS only or overlapping UE-SS and common search space (CSS) according to embodiments of the present disclosure. The embodiment illustrated in FIG. 11 is for illustration only. Other embodiments are used without departing from the scope of the present disclosure.

As shown in FIG. 11, a UE can be configured with CORESET with ID=1, whose monitoring occasions are given by offset=T1 and periodicity=P. Associated with CORESET=1 are two search spaces (SSs). The first search space is of type common search space (CSS), configured with highest priority (priority index=1) and configured to be present (valid) on occasions which are spaced odd multiples of P with respect to the offset T1. The second SS is a UE-SS, configured to be present (valid) on each CORESET monitoring occasion. Each SS configuration includes whether an IS field is present on a DL assignment DCI sent via that SS, and if not, either indicate a fixed set of QCL parameters for PDSCH beam indication or indicate a certain UE behavior (e.g. apply QCL parameters identically as that used to receive the scheduling PDCCH on that SS) for receiving PDSCH. The CSS configuration can include indicator state=OFF; thus the UE would apply the QCL parameters for receiving PDSCH identically as that used for receiving PDCCH on that CORESET. The UE-SS, on the other hand, can be configured with IS=ON, implying that at times t=T1, t=T1+2P etc., the UE derives the QCL parameters for receiving PDSCH, following decoding the DCI on that UE-SS, based on the DL RS index(-es) associated with the IS field in the scheduling DCI. On a CORESET monitoring occasion containing overlap of CSS and USS (e.g. t=T1+P, T1+3P etc.), since the CSS takes higher priority, the UE applies identical QCL parameters as that used for receiving PDCCH on the CORESET.

In a fourth embodiment, higher-layers can signal the presence/absence of an IS field on a given CORESET at specific time instances. Based on the above example, suppose CORESET 1 is configured with offset=T1, periodicity=P. The CORESET configuration can include that at times t=T1+k*P (k=odd), the QCL parameters for PDSCH beam indication are either identically set as that for receiving PDCCH on the CORESET, or alternatively the QCL parameters for PDSCH beam indications can be provided via higher-layer signaling. At these times, the UE can be scheduled with DL assignment (lying on a CSS or UE-SS or both) such that the QCL parameters for the PDSCH and PDCCH are identical, or alternatively, the UE can receive PDCCH based on the TCI state configured for the CORESET and receive PDSCH by employing a higher-layer signaled set of QCL parameters. At times t=T+k*P (k=even), the CORESET configuration can specify that IS=ON, implying that at these times, the UE infers its QCL parameters for receiving PDSCH from the IS field in the DL assignment DCI.

A combination of the above embodiments is also possible. For example, if the CORESET is configured with a UE-SS, then the UE-SS configuration, indicated via higher-layers, will inform the UE whether it should determine the QCL parameters for PDSCH via decoding DCI within the UE-SS monitoring occasion or whether it should apply the QCL parameters for PDSCH identically to that used for PDCCH within that CORESET. When the CORESET monitoring occasion corresponds to a UE-SS, the UE uses the higher-layer configuration to determine how to derive QCL parameters for PDSCH beam indication. When the CORESET monitoring occasion corresponds to a UE-SS and CSS or CSS only, the UE applies the QCL parameters for PDSCH beam indication identically to that used for PDCCH within that CORESET.

In the operation 930, for beam indication update purposes, MAC-CE may be used to explicitly signal/update the IS and the RS index (of type P CSI-RS or SS Block) which replaces the existing configured RS as spatial QCL reference. The MAC-CE implicitly also updates the spatial QCL reference used for a corresponding UE-specific CORESET if that CORESET is linked to that IS. Reception of an activation MAC CE for a SP CSI-RS resource activates that resource as QCL reference (if that resource is a set member among the candidate RS configured for QCL reference) for the associated indicator state (s).

For example, as shown in Table 2, RRC can initially link IS=1 with candidate SP CSI-RS {CRI=2, CRI=3}. Since SP CSI-RS resources can be activated only via MAC-CE signaling, the RRC configuration links IS=1 to two inactive resources. At a later time, if an activation MAC-CE activating CRI=2, the UE assumes for IS=1, the SP CSI-RS with CRI=2 provides spatial QCL reference. Thus, when a DL assignment DCI containing IS=1 is received, or during PDCCH DM-RS reception on a UE-specific CORESET linked with IS=1, the UE assumes that the SP CSI-RS with CRI=2 provides spatial QCL reference. In an alternative embodiment, the RRC configuration may indicate "default" active resource(s) for each IS. In one method, all the configured resources are active; in another method, a first configured resource is active; in another method, activated resource(s) are explicitly indicated.

In the operation 940, the network performs an AP CSI-RS triggering. In one embodiment, the network can use an AP CSI-RS for transmitting narrow (refined) beams for providing high rate PDSCH transmission via spatially multiplexing different streams on different refined beams.

Figure 12:
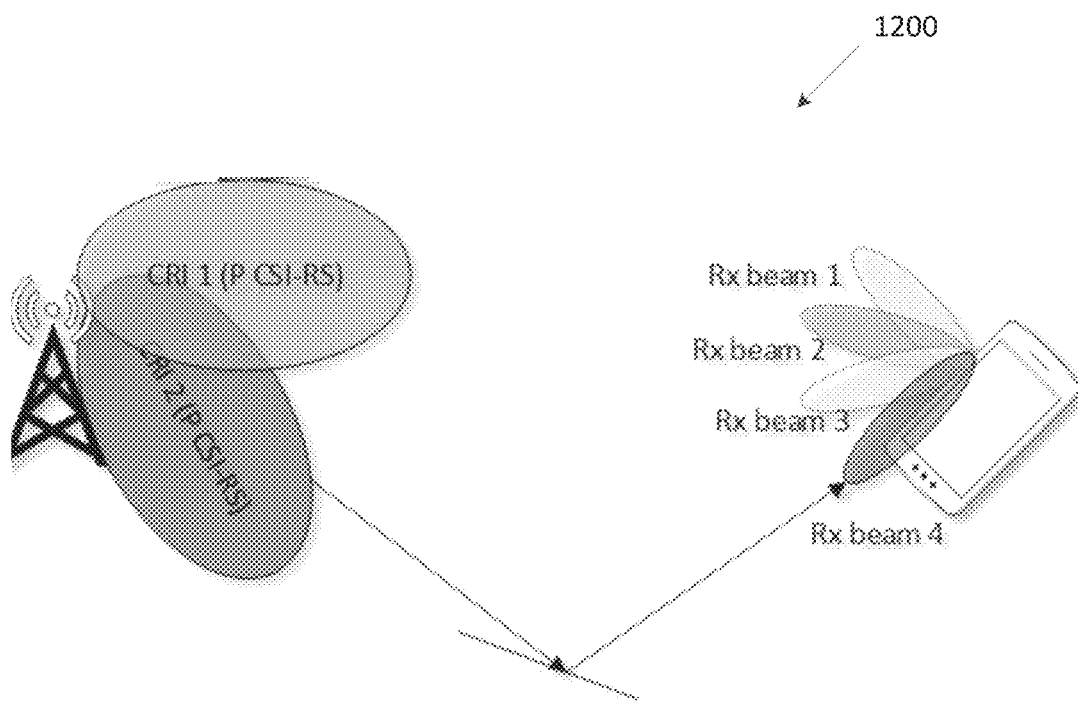
FIG. 12 illustrates exemplary AP CSI-RSs within an angular coverage of P-CSI-RS beam for beam refinement according to embodiments of the present disclosure.
Figure 12:
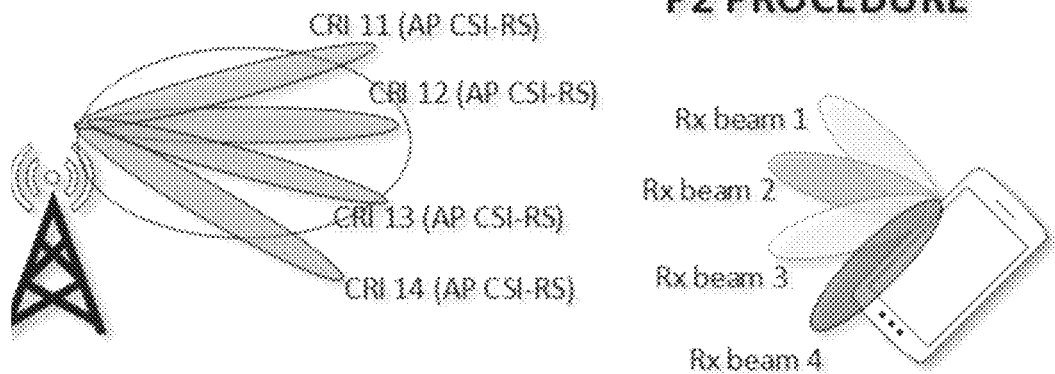

FIG. 12 illustrates exemplary AP CSI-RSs 1200 within an angular coverage of P-CSI-RS beam for beam refinement according to embodiments of the present disclosure. The embodiment illustrated in FIG. 12 is for illustration only. Other embodiments are used without departing from the scope of the present disclosure.

In one embodiment, a UL-DCI can trigger a set of AP CSI-RS CRIs, each CRI corresponding to a single symbol RS resource, configured with repetition='off' (implying that the UE may not assume that the gNB maintains a fixed TX beam) for purposes of determining the strongest AP CSI-RS resource (beam). To receive the triggered AP CSI-RS resources, the UE derives its QCL reference for receiving the triggered AP CSI-RS resources by applying the QCL parameters (including spatial QCL reference) used for receiving the RRC configured RS linked to that IS. Following measurement of each aperiodic resource, the UE is configured to report pair(s) of an RSRP value and a CRI index. For example, as shown in FIG., if RRC has linked IS=Y with a P CSI-RS beam index CRI=1, then upon receiving an UL DCI which triggers AP CSI-RSs {CRI 11, CRI 12, CRI 13, CRI 14} [each AP CSI-RS resource spans a single-symbol and configured with repetition='off'] with IS=Y, the UE receives the AP CSI-RS beams using the same Rx beam as that used for P CSI-RS (CRI=1). The UE keeps the spatial RX parameters associated with that IS unchanged but modifies its QCL reference parameters (such as Delay/Doppler/Average Gain), to now be associated with the strongest measured AP CSI-RS beam within the beam indexes {CRI 11, CRI 12, CRI 13, CRI 14}.

In a second different embodiment, a UL-DCI can trigger a set of AP CSI-RS CRIs, each CRI corresponding to a single symbol RS resource, configured with repetition='on' (implying that the UE may assume that the gNB maintains a fixed TX beam) for purposes of the UE to determine its best RX beam for receiving the triggered AP CSI-RS resources. Suppose we assume the same example as the previous paragraph and suppose the triggered AP CSI-RS resources {CRI 11', CRI 12', CRI 13', CRI 14'} are configured with repetition='on', implying that each of the AP CSI-RS resources are transmitted using identical TX beams. The UE can refine its RX spatial filter configuration (or RX beam) in a manner which maximizes its post-processed SINR upon receiving the AP CSI-RS beam. The UE receives the AP CSI-RS beams starting with an Rx beam identical to that applied to receive the QCL reference DL RS namely the P CSI-RS (CRI=1). The UE can subsequently refine its RX beam, modified at the start of each repetition. For this method of refining Rx beam across multiple repetitions of the same AP CSI-RS resource (TX beam), the UE may be configured to report RSRP value(s) without CRI index; In an alternative embodiment, when the triggered AP CSI-RS resource is configured with repetition='on, the UE may be explicitly indicated whether to report CRI index or not and report CSI/BSI.

In an additional method, it can be beneficial to specify conditions under which the linkage between an IS and an AP CSI-RS resource index is valid since the alignment of refined beams is more sensitive to the environment or the state of the UE. The UE assumes that a linkage between the IS and the AP CSI-RS is a valid linkage as long as none of the following conditions apply:

a) The P/SP-CSI RS or SS block linked to the IS has been updated since the last AP CSI-RS measurement at the UE for that IS. The RS index mapped to the IS as signaled by the new RRC or MAC-CE signaling can be the same or different index than before. The signaling implies that the existing linkage between the IS and the AP CSI-RS can potentially be misaligned with the updated RS index mapped to the IS. Upon detecting that the linkage is invalid, the UE discards its AP CSI-RS resource index as spatial QCL reference and subsequently assumes that its spatial QCL reference on that IS corresponds to the last received RRC/RRC+MAC-CE signaled RS index for that IS.

b) A different AP CSI-RS resource index mapped to the same IS has been triggered more recently. In such a case, the most recent AP CSI-RS resource index is assumed as spatial QCP reference for the IS.

c) A timer in which the linkage between the IS and AP CSI-RS remains valid is configured by the higher layer. In one embodiment, the UE starts a timer for an IS whenever the UE sends a AP CSI-RS measurement report for that IS. Upon expiry of the timer, the linkage between the IS and the AP CSI-RS is treated as no longer valid. In such a case, in one embodiment, the UE assumes that the spatial QCL reference for that IS corresponds to the last received RRC/RRC+MAC-CE configured RS index.

d) The UE has (re-)entered RRC_Inactive mode. Upon re-entering RRC_Connected mode, the UE assumes its last received RRC/RRC+MAC-CE configured RS index as the spatial QCL reference for that IS.

e) The UE has (re-)entered RRC_IDLE mode.

In the operation 950, PDSCH beam indication is performed by using PDSCH-Demodulation Reference signals (DM-RS). If UE detects a DL assignment with a DCI field IS=Y, then to receive the corresponding PDSCH-DM-RS, the UE uses the last configured DL RS index(-es) set as QCL reference for IS=Y For example, as indicated in the operations 101 through 103, RRC/RRC+MAC-CE signaling can have previously updated the DL RS index (es) in the RS Set associated to that IS. This implies that when the UE receives a DL assignment containing an IS field, the UE uses its last configured DL RS index(-es) associated to that IS value as QCL reference to receive the DM-RS ports for the scheduled PDSCH. The above described principle for updating the QCL reference can also be extended to the scenario when the QCL reference associated to an IS is updated via triggering of AP CSI-RS. Suppose based on the AP CSI-RS triggering mechanism described in operation 904, a set of AP CSI-RS resources are triggered with repetition='off' using a UL DCI with the indicator field set to Y. To receive the AP CSI-RS resources (beams), the UE employs a QCL reference derived from the DL RS index (-es) associated with IS=Y. Following measurement of that AP CSI-RS resource, the UE subsequently updates its spatial QCL parameters for IS=Y to the ID associated to correspond to the strongest measured AP CSI-RS from among the triggered AP CSI-RS resources. That is, whenever the UE receives a DL assignment containing an IS field set to IS=Y, then to receive the PDSCH-DMRS, the UE employs spatial RX parameters (RX beam) identically to that used to receive the strongest measured AP CSI-RS among the triggered AP CSI-RS resources. Before receiving any AP-CSI-RS for IS=Y, the UE assumes that the QCL reference for the PDSCH is derived from the DL RS index (-es) in the RS set configured as QCL reference for IS=Y. Following the AP CSI-RS trigger, if the UE subsequently receives via RRC/RRC+MAC-CE signaling, an updated DL RS index (-es) associated with IS=Y, the UE applies those DL RS index (-es) as QCL reference whenever it receives a DL assignment containing an IS field with value IS=Y. In an alternative embodiment, based on the AP CSI-RS triggering mechanism described in the operation 904, if a set of AP CSI-RS resources (beams) has been previously triggered using a UL DCI with the indicator field set to Y and repetition='on' for the AP-CSI-RS, implying that UE receives multiple AP CSI-RS resources with the same TX beam in multiple OFDM symbols, the UE assumes that most recently triggered AP CSI-RS resource with repetition='on' as QCL reference for determining its Rx beam to receive its PDSCH-DMRS. Before receiving any AP-CSI-RS with repetition='on' for IS=Y, the UE assumes that the QCL reference for receiving its PDSCH is the most recent RS index configured as QCL reference for that IS.

In the operation 960, PDCCH beam indication is performed. For receiving PDCCH on a UE-specific CORESET monitoring occasion, the UE shall apply the Rx beam determined from the RRC configured indicator state linked to that CORESET. As indicated in the operations 101 through 103, the gNB can initialize and subsequently update the RS indexes associated with a given IS using RRC/RRC+command medium access control (MAC)-control element (CE) signaling, and the most recent update for that IS indicates which RS index should be used as spatial QCL reference to receive that CORESET. For PDCCH beam indication to flexibly co-exist with PDSCH beam indication, it is desirable for supporting the following use-cases: 1) For reception of PDCCH using refined beams it may be desirable to allow spatial QCL reference for PDCCH reception to be dynamically updated as part of beam refinement (e.g. through DCI based triggering of A CSI-RS). 2) For simultaneous operation of PDCCH on a relatively stable, wide beam with low frequency of update with PDSCH reception on possibly narrow (refined) beams, the following hooks are useful: a. Allow for the possibility that if a certain IS is common to both PDSCH and UE-specific CORESET reception, it should be possible to link that IS to a narrow (refined) beam for PDSCH reception and a coarse (wide) beam for PDCCH reception. One way to do so is providing hooks to disable dynamic update of spatial QCL reference (e.g. DCI triggered beam refinement via AP CSI-RS) for UE-specific CORESET (s); b. Provide hooks to support fall back operation in case PDSCH operation using refined beams is unreliable; In such a case, it may be desirable to support a mode where the UE may assume that the scheduled PDSCH is received using the same Rx beam as used for the scheduling PDCCH (CORESET).

To facilitate use-case 1), a parameter in the CORESET RRC signaling can be used to indicate whether or not the spatial QCL reference for that CORESET can be additionally updated based on a DCI triggered AP CSI-RS resource. Assume an AP CSI-RS is triggered using an UL DCI indicating QCL reference for that AP CSI-RS corresponds to IS=Y. Following measurement on that AP CSI-RS, for purposes of receiving PDSCH with IS=Y, the UE subsequently replaces the existing spatial QCL reference associated with IS=Y with that AP CSI-RS resource (beam). In one embodiment, an RRC parameter enableDciTriggeredQclUpdate for that CORESET is defined such that if this parameter is enabled (set to 1), the UE uses the triggered AP CSI-RS as spatial QCL reference for reception of the PDCCH-DMRS within that CORESET. On the other hand, if enableDciTriggeredQclUpdate is set to 0, the UE ignores any DCI triggered beam refinement using AP CSI-RS on IS=Y and only uses the most recent RRC/RRC+MAC-CE configured RS as QCL reference for receiving the PDCCH-DMRS on that CORESET. For example, suppose RRC initially configures CORESET 1 to be linked with IS=1 on a coarse beam (CRI=3, type=SP CSI-RS). The gNB can via MAC-CE signaling subsequently link IS=1 with a different coarse beam (CRI=5, type=SP CSI-RS). If the gNB wants to employ refined beams for PDSCH on IS=1, it can trigger 4 narrow beams via AP CSI-RS on CRIs={51,52,53,54}) using a UL DCI containing the field IS set to 1. Upon measurement, the UE subsequently associates IS=1 with the strongest measured AP CSI-RS say CRI=53 for PDSCH beam indication purposes. Thus, when the UE detects a DL assignment with IS=1, it receives the scheduled PDSCH by employing the RX beam corresponding to CRI=53 as spatial QCL reference. If for CORESET 1, the parameter enableDciTriggeredSpatialQclUpdate is set to 1, then during CORESET 1's monitoring occasions, the UE employs AP CSI-RS resource CRI=53 as spatial QCL reference.

On the other hand, if enableDciTriggeredSpatialQclUpdate is set to 0, the UE is only allowed to use the most recent RRC+MAC-CE signaled RS as spatial QCL reference i.e., the UE is not allowed to update its spatial Rx parameter for that IS via DCI triggered updates. For this example, the UE would then employ the coarse beam (CRI=5 type=SP CSI-RS) as spatial QCL reference on CORESET 1. Table 2A summarizes the UE behavior based on the different states of enableDciTriggeredSpatialQclUpdate.

TABLE 3A

| State of enableDciTriggeredSpatialQclUpdate for a UE-specific CORESET | QCL update UE behavior for receiving the PDCCH in that CORESET |
|---|---|
| Enabled (1) | If the IS associated with the CORESET has a reference to a DCI triggered AP CSI-RS resource configured with repetition = 'on', the UE assumes that the AP CSI-RS resource provides the QCL reference for receiving the PDCCH-DMRS on that CORESET. In such a case, the UE applies all the QCL parameters (including spatial QCL parameters) derived from the last triggered measurement on that aperiodic CSI-RS resource. If the IS associated with the CORESET has a reference to a DCI triggered AP CSI-RS resource configured with repetition = 'off', the UE assumes that the AP CSI-RS resource provides the QCL reference (with the exception of spatial RX parameters) for receiving the PDCCH-DMRS on that CORESET. In such a case, the UE applies all the QCL parameters (excluding spatial QCL parameters) derived from the last triggered measurement on that aperiodic CSI-RS resource. If no such aperiodic CSI-RS has been triggered yet for the IS associated with that CORESET, the QCL reference is the last configured RS resource signaled via RRC/RRC + MAC-CE signaling. |
| Disabled (0) | UE may assume that for the PDCCH reception purpose on the CORESET, the QCL reference is the RS resource(s) indicated by the corresponding IS for the CORESET. |

To enable flexible beam indication for PDSCH and PDCCH for use-cases 2a and 2b, the following embodiments are provided:

Embodiment 1

If enableDciTriggeredSpatialQclUpdate is enabled (set to 1) for a certain UE-specific CORESET, then the QCL reference for that CORESET may be dynamically updated via DCI triggering of an AP CSI-RS resource, which shares the same initial QCL reference as that CORESET. The QCL reference for the trigger of the AP CSI-RS can be provided either by explicitly signaling a DL RS index (associated with that CORESET configuration) or by signaling the IS having a reference to that DL RS index. If no such aperiodic CSI-RS has been triggered yet for the IS associated with that CORESET, the QCL reference is the last configured RS resource signaled via RRC/RRC+MAC-CE signaling. This is also described under Step 2. This embodiment can be used to receive PDCCH on that CORESET using refined (narrow) beams transmitted using AP CSI-RS as QCL reference.

If enableDciTriggeredSpatialQclUpdate is disabled (set to 0), the QCL reference for reception of the PDCCH-DMRS belonging to that CORESET is determined via the most recent RRC/RRC+MAC-CE signaling received for that CORESET.

Embodiment 2

In another embodiment, if the RRC configuration of a UE-specific CORESET includes a Boolean includeIndicatorStateInDci set to 1, then when the UE detects a DCI scheduled within that CORESET, then: If the DCI message triggers AP CSI-RS, the UE assumes that the DL RS associated with the IS within the DCI message provides the QCL reference (including spatial RX parameters) for the AP CSI-RS resource (s); If the DCI message schedules a PDSCH, the UE assumes that the DL RS associated with the IS within the DCI message provides the QCL reference (including spatial RX parameters) for the scheduled PDSCH.

The above setting of includeIndicatorStateInDci=1 on a CORESET can be used to realize PDSCH reception and PDCCH reception on that CORESET, using possibly different QCL assumptions (e.g. wide beams for PDCCH and refined beams for PDCCH).

On the other hand, if the RRC configuration of a UE-specific CORESET includes a Boolean includeIndicatorStateInDci set to 0 (disabled), then: for receiving the PDCCH-DMRS associated with that CORESET, the UE assumes the existing QCL reference (including spatial RX parameters) received via RRC/RRC+MAC-CE signaling for that CORESET; for receiving AP CSI-RS triggered by a PDCCH scheduled on that CORESET, the UE applies the existing QCL reference (including spatial RX parameters) associated with that CORESET; for receiving the PDSCH-DMRS scheduled via a PDCCH carrying a DL assignment DCI within that CORESET, the UE applies the existing QCL reference (including spatial RX parameters) associated with that CORESET.

The above setting of includeIndicatorStateInDci=0 on a CORESET can be used to realize PDSCH reception and AP CSI-RS reception to follow identical QCL assumptions as that used for receiving the PDCCH-DMRS on that CORESET (e.g. PDSCH is received applying the same RX beam and other QCL parameters as that used for the scheduling PDCCH). Or alternatively, on that CORESET, the PDSCH can be received using a default set of higher-layer signaled QCL parameters, which can be shared among all CORESETs which are configured with includeIndicatorStateInDci=0. This mechanism can be used to implement fallback reception of PDSCH for improved robustness.

Embodiment 3

In a third embodiment, if the RRC configuration of a UE-specific CORESET includes a Boolean includeIndicatorStateInDlAssignmentDci set to 1, then when the UE detects a DCI assignment scheduled within that CORESET, then the UE assumes that the DL RS associated with the IS within the DCI message provides the QCL reference (including spatial RX parameters) for the scheduled PDSCH. The above setting of includeIndicatorStateInDlAssignmentDci=1 on a CORESET can be used to realize PDSCH reception and PDCCH reception on that CORESET, using possibly different QCL assumptions (e.g. wide beams for PDCCH and refined beams for PDCCH)

On the other hand, if the RRC configuration of a UE-specific CORESET includes a Boolean includeIndicatorStateInDlAssignmentDci set to 0 (disabled), then any DL assignment messages sent via PDCCH on that CORESET do not carry an IS field. However, other DCI messages (e.g. AP CSI-RS trigger, UL grant etc.) will still carry an IS field. The UE applies the following behaviors. If the DCI message triggers AP CSI-RS, the UE assumes that the DL RS associated with the IS within the DCI message provides the QCL reference (including spatial RX parameters) for the AP CSI-RS resource (s). For receiving the PDCCH-DMRS associated with that CORESET: If enableDciTriggeredSpatialQclUpdate is set to 1 (enabled), the UE assumes the existing QCL reference (including spatial RX parameters) is either corresponding to the most recent triggered AP CSI-RS which shares the same QCL reference as that CORESET; if no such aperiodic CSI-RS has been triggered yet for the IS associated with that CORESET, the assumed QCL reference is the last configured RS resource signaled via RRC/RRC+MAC-CE signaling for that CORESET; If enableDciTriggeredSpatialQclUpdate is disabled (set to 0), the QCL reference for reception of the PDCCH-DMRS belonging to that CORESET is determined via the most recent RRC/RRC+MAC-CE signaling received for that CORESET.

For receiving the PDSCH-DMRS scheduled via a PDCCH carrying a DL assignment DCI within that CORESET, the UE applies the existing QCL reference (including spatial RX parameters) associated with that CORESET illustration only. Other embodiments could be used without departing from the scope of this disclosure.

The operation 1310, a network (or a base station), via an RRC layer signaling, configures a table of ISs and their associated RS set(s) as describe above in the operation 901 under the previous section "Indicator State based Beam Indication Framework for PDSCH and PDCCH." Refer to Table 4 for example RRC configuration for PDCCH beam indication. note that IS is not used for the PDCCH beam indication here. Table 1 can be used for PDCCH beam indication as described above.

In operation 1320, for PDCCH beam indication, the network (or the BS), via an RRC layer signaling, configures a set of candidate RS per UE-specific CORESET. In one embodiment, a 1-bit field [enableDciTriggeredSpatialQclUpdate] may be optionally provided per UE-specific CORESET. If this parameter is enabled (set to 1), then the RX beam for receiving the PDCCH DM-RS for that CORESET can be updated dynamically through a DCI triggering AP CSI-RS. An additional parameter signaling the presence/absence of a beam indication field can be indicated during RRC configuration of that CORESET. In one embodiment, a field includeIndicatorStateInDlAssignmentDci is defined within the CORESET RRC configuration such that if includeIndicatorStateInDlAssignmentDci is enabled (resp. disabled) for this CORESET, the DCI message in the PDCCH within that CORESET includes (resp. does not include) an IS field. Refer to Table 4 for example RRC configurations. If the includeIndicatorStateInDlAssignmentDci is set to off (Disabled) on a given CORESET, the UE applies the QCL parameters (including spatial RX parameters) identically to that used for receiving the PDCCH (carrying the DL assignment) on that CORESET in the operation 1370 similarly to the operation 970.

TABLE 4

| CORESET configuration for PDCCH beam indication | | | |
| --- | --- | --- | --- |
| CORESET Index | DL Assignment Parameters | PDCCH Beam Indication Parameters | Comment/use-case |
| 0 | includeIndicatorStateInDlAssignmentDci = 1 (default: 1) | {SS Block Time Index 24}, RS Setting 3, Type = SS Block, QCL Type = All QCL parameters. enabledDciTriggeredSpatialQclUpdate = 0. | CORESET 0 reception assumes SS Block (Block Time Index = 24) as QCL reference |
| 1 | includeIndicatorStateInDlAssignmentDci = 0 | {CRI 2, CRI 3}, RS Setting 2, Type = SP CSI-RS, QCL Type: All QCL parameters. enabledDciTriggeredSpatialQclUpdate = 1. | CORESET 1 reception assumes {CRI 2, CRI 3}, of type SP CSI-RS as QCL reference. The QCL reference for the CORESET 0 can be additionally updated dynamically via DCI triggering of AP CSI-RS. |

The above setting of includeIndicatorStateInDci=0 on a CORESET can be used to realize PDSCH reception to follow identical QCL assumptions as that used for receiving the PDCCH-DMRS on that CORESET (e.g. PDSCH is received applying the same RX beam and other QCL parameters as that used for the scheduling PDCCH). This can be used to implement fallback reception of PDSCH for improved robustness.

Independent PDSCH and PDCCH Beam Indication

Figure 13:
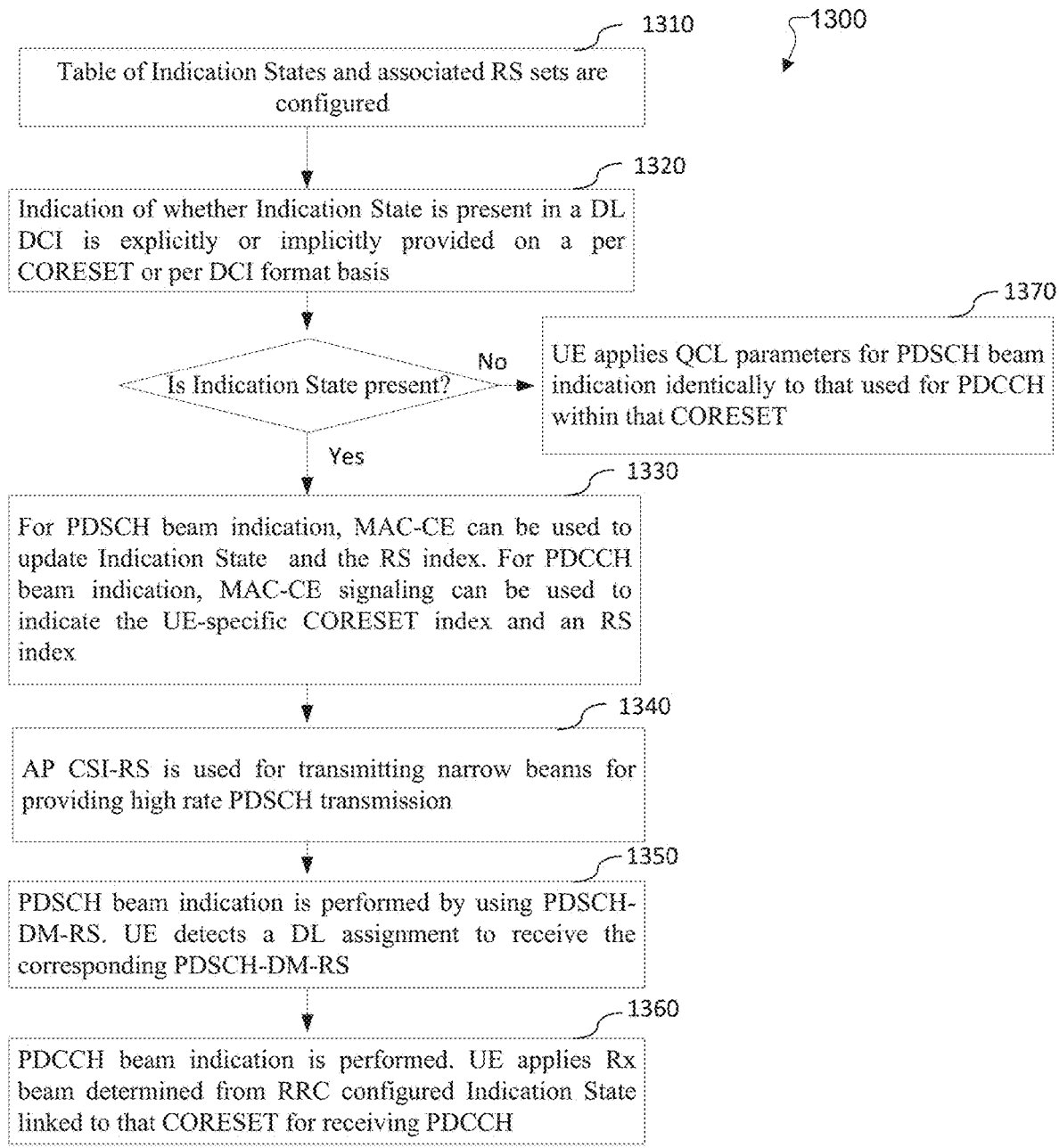
FIG. 13 illustrates another exemplary flowchart for PDSCH and PDCCH beam indications according to embodiments of the present disclosure.

This section provides description of independent PDSCH and PDCCH beam indication configurations. FIG. 13 illustrates another exemplary flowchart 1300 for PDSCH and PDCCH beam indications according to embodiments of the present disclosure. The embodiment shown in FIG. 13 is for In operation 1330, MAC-CE signaling can be used to indicate two types of association. For PDSCH beam indication purposes, MAC-CE may be used explicitly signal the IS and the RS index (of type P CSI-RS or SS Block) which replaces the existing configured RS as spatial QCL reference (i.e., get configured with a refined DCI indication table for PDSCH reception purpose. The refined table is derived from the RRC configured table, with removing the deactivated RS and keeping the activated RS only). For PDCCH beam indication purposes, MAC-CE signaling can be used to indicate the UE-specific CORESET index and an RS index (of type P CSI-RS resource or SS Block) which replaces the existing configured RS as spatial QCL reference (i.e., an IS to be used as QCL reference is updated for each CORESET). Reception of an activation MAC CE for a SP CSI-RS resource activates that resource as QCL reference (if that resource is a set member among the candidate RS configured for QCL reference) for the associated indicator state (s) and UE-specific CORESET (s).

In the operation 1340, the network performs an AP CSI-RS triggering as described in the operation 904. The network can use AP CSI-RS for transmitting narrow (refined) beams for providing high rate PDSCH transmission via spatially multiplexing different streams on different refined beams.

In operation 1350, the PDSCH beam indication is identical to the operation 950 under the previous section "Indicator State based Beam Indication Framework for PDSCH and PDCCH."

In operation 1360, PDCCH beam indication is performed. for receiving PDCCH on a UE-specific CORESET monitoring occasion, the UE shall apply the Rx beam determined from the RRC configured RS linked to that CORESET. Whenever a UE-specific CORESET and an IS are linked to the same RS index, identical considerations/use-cases/methods/embodiments, as described under the use-cases in the operation 960 under the previous section "Indicator State based Beam Indication Framework for PDSCH and PDCCH" apply. For sake of conciseness, the paragraphs are not repeated.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) comprising:
a transceiver; and
a processor operably coupled to the transceiver, the processor configured to;
identify whether a parameter of a higher layer configuration for a control resource set (CORESET), received from a base station, is set as enabled or not;
when the higher layer parameter is set as enabled, for downlink (DL) control information (DCI) of a first DCI format:
identify an indication field is present in the DCI of the first DCI format, conveying a DL assignment, transmitted by a physical DL control channel (PDCCH) on the CORESET, and
identify a first quasi co-location (QCL) parameter for a physical DL shared channel (PDSCH) antenna port based on the indication field; and
when the higher layer parameter is not set as enabled, for the DCI of the first DCI format thereby indicating that the indication field is absent or DCI of a second DCI format different from the first DCI format is received:
use a second QCL parameter for PDSCH which is identical to a QCL parameter used for receiving the PDCCH, and
control the transceiver to receive, from the base station, data over the PDSCH using the first QCL parameter or the second QCL parameter.

2. The UE of claim 1, wherein the higher layer parameter is set on per CORESET basis as part of a radio resource control (RRC) configuration of the CORESET.

3. A base station comprising:
a transceiver; and
a processor operably coupled to the transceiver, the processor configured to:
generate a parameter of a higher layer configuration for a first control resource set (CORESET);
when the higher layer parameter is set as enabled, indicate that an indication field is present in a first downlink (DL) control information (DCI) of a first DCI format conveying a first DL assignment, transmitted by a first physical DL control channel (PDCCH) on the first CORESET, the indication field indicating a first quasi co-location (QCL) parameter for a physical DL shared channel (PDSCH) antenna port; and
when the higher layer parameter is not set as enabled, for the DCI of the first DCI format thereby indicating that the indication field is absent or DCI of a second DCI format different from the first DCI format is transmitted, control the transceiver to transmit data over the PDSCH using the first QCL parameter or a second QCL parameter which is identical to a QCL parameter used for the PDCCH.

4. The base station of claim 3, wherein the higher layer parameter is set on per CORESET basis as part of a radio resource control (RRC) configuration of the CORESET.

5. A method for operating a user equipment, the method comprising:
identifying whether a parameter of a higher layer configuration for a control resource set (CORESET), received from a base station, is set as enabled or not;
when the higher layer parameter is set as enabled, for downlink (DL) control information (DCI) of a first DCI format:
identifying an indication field is present in the DCI of the first DCI format, conveying a DL assignment, transmitted by a physical DL control channel (PDCCH) on the CORESET, and
identifying a first quasi co-location (QCL) parameter for a first-physical DL shared channel (PDSCH) antenna port based on the indication field; and
when the higher layer parameter is not set as enabled, for the DCI of the first DCI format thereby indicating that the indication field is absent or DCI of a second DCI format different from the first DCI format is received:
using a second QCL parameter which is identical to a QCL parameter used for receiving PDCCH; and
receiving data over the PDSCH using the first QCL parameter or the second QCL parameter from the base station.

6. The method of claim 5, wherein the higher layer parameter is set on per CORESET basis as part of a radio resource control (RRC) configuration of the CORESET.

* * * * *